United States Patent
Jiang

(10) Patent No.: US 11,616,729 B2
(45) Date of Patent: *Mar. 28, 2023

(54) METHOD AND APPARATUS FOR PROCESSING LOW-LATENCY SERVICE FLOW

(71) Applicant: Huawei Technologies Co., Ltd., Shenzhen (CN)

(72) Inventor: Yuanlong Jiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,201

(22) Filed: Apr. 5, 2021

(65) Prior Publication Data

US 2021/0226897 A1 Jul. 22, 2021

Related U.S. Application Data

(63) Continuation of application No. 16/285,913, filed on Feb. 26, 2019, now Pat. No. 10,972,398, which is a (Continued)

(30) Foreign Application Priority Data

Aug. 27, 2016 (CN) .......................... 201610743336.6

(51) Int. Cl.
  *G06F 15/16* (2006.01)
  *H04L 47/2483* (2022.01)
  (Continued)

(52) U.S. Cl.
  CPC .......... *H04L 47/2483* (2013.01); *H04L 43/12* (2013.01); *H04L 45/50* (2013.01); (Continued)

(58) Field of Classification Search
  CPC .......................... H04L 47/10; H04L 47/2416
  See application file for complete search history.

(56) References Cited

U.S. PATENT DOCUMENTS 5,787,071 A * 7/1998 Basso ................. H04L 12/5602
  370/231
6,618,357 B1 * 9/2003 Geyer ................... H04L 67/325
  370/428

(Continued)

FOREIGN PATENT DOCUMENTS

CN   101488914 A   7/2009
CN   101645849 A * 2/2010
(Continued)

OTHER PUBLICATIONS

Awduche, D., et al, "RSVP-TE: Extensions to RSVP for LSP Tunnels," Network Working Group, rfc3209, Dec. 2001, 61 pages.

(Continued)

*Primary Examiner* — Hieu T Hoang
(74) *Attorney, Agent, or Firm* — Conley Rose, P.C.

(57) ABSTRACT

A method and an apparatus for processing a low-latency service flow, where the method includes that a first forwarding device obtains a low latency identifier corresponding to a first service flow, and obtains a second data packet based on the first data packet and the low latency identifier after determining that a received first data packet belongs to the first service flow, where the second data packet includes the first data packet and the low latency identifier, the low latency identifier instructing a forwarding device that receives the first service flow to forward the first service flow in a low-latency forwarding mode, and the low-latency forwarding mode is a mode in which fast forwarding of the first service flow is implemented under dynamic control, and the first forwarding device sends the second data packet to (Continued)

a second forwarding device in the low-latency forwarding mode.

24 Claims, 12 Drawing Sheets

Related U.S. Application Data continuation of application No. PCT/CN2017/088695, filed on Jun. 16, 2017.

(51) Int. Cl.
*H04L 45/50* (2022.01)
*H04L 43/12* (2022.01)
*H04L 47/17* (2022.01)
*H04L 47/724* (2022.01)
*H04L 47/70* (2022.01)
*H04L 47/10* (2022.01)

(52) U.S. Cl.
CPC ............ *H04L 47/17* (2013.01); *H04L 47/724* (2013.01); *H04L 47/825* (2013.01); *H04L 47/10* (2013.01)

(56) References Cited

U.S. PATENT DOCUMENTS

| | | | |
|---|---|---|---|
| 6,643,259 B1 | 11/2003 | Borella et al. | |
| 6,768,738 B1* | 7/2004 | Yazaki | H04L 67/327 |
| | | | 370/392 |
| 6,985,488 B2 | 1/2006 | Pan et al. | |
| 7,027,396 B1 | 4/2006 | Golan et al. | |
| 7,626,986 B1 | 12/2009 | Tse-Au | |
| 9,107,230 B2* | 8/2015 | Jin | H04W 72/1242 |
| 9,124,524 B2 | 9/2015 | Winegarden et al. | |
| 10,291,517 B1 | 5/2019 | Abraham et al. | |
| 2002/0048259 A1* | 4/2002 | Adam | H04Q 11/0478 |
| | | | 709/225 |
| 2005/0135252 A1 | 6/2005 | Singh et al. | |
| 2005/0243829 A1 | 11/2005 | Spencer | |
| 2006/0056291 A1* | 3/2006 | Baker | H04L 43/00 |
| | | | 370/229 |
| 2006/0239188 A1 | 10/2006 | Weiss et al. | |
| 2007/0165668 A1 | 7/2007 | Liu | |
| 2008/0101354 A1 | 5/2008 | Amdt | |
| 2008/0159129 A1 | 7/2008 | Songhurst et al. | |
| 2008/0253288 A1* | 10/2008 | Aimoto | H04L 47/22 |
| | | | 370/235.1 |
| 2009/0274047 A1* | 11/2009 | Kruys | H04L 47/30 |
| | | | 370/236 |
| 2010/0188974 A1 | 7/2010 | Rochon et al. | |
| 2010/0322150 A1 | 12/2010 | Wilcoxson et al. | |
| 2011/0205891 A1* | 8/2011 | Kliger | H04L 47/805 |
| | | | 370/230 |
| 2011/0289295 A1* | 11/2011 | Chen | H04L 43/022 |
| | | | 711/E12.002 |
| 2013/0010798 A1* | 1/2013 | Shaffer | H04L 47/17 |
| | | | 370/395.42 |
| 2013/0212268 A1 | 8/2013 | Fu et al. | |
| 2014/0056141 A1* | 2/2014 | Breternitz, Jr. | H04L 49/10 |
| | | | 370/235 |
| 2014/0280835 A1 | 9/2014 | Pruss et al. | |
| 2015/0146536 A1 | 5/2015 | Minei et al. | |
| 2016/0234527 A1 | 8/2016 | Rodriguez et al. | |
| 2016/0295579 A1 | 10/2016 | Pham et al. | |
| 2016/0308786 A1 | 10/2016 | Chen et al. | |
| 2017/0026301 A1* | 1/2017 | Keller | H04L 47/621 |
| 2018/0026933 A1 | 1/2018 | Asati et al. | |
| 2018/0115493 A1 | 4/2018 | Van Leekwijck et al. | |
| 2019/0253339 A1 | 8/2019 | Mehmedagic | |
| 2020/0205025 A1* | 6/2020 | Saha | H04W 28/0268 |

FOREIGN PATENT DOCUMENTS

| | | |
|---|---|---|
| CN | 101645849 A | 2/2010 |
| CN | 102238073 A | 11/2011 |
| CN | 104579962 A | 4/2015 |
| CN | 105847176 A | 8/2016 |
| EP | 2624506 A1 | 8/2013 |
| KR | 20030089867 A | 11/2003 |

OTHER PUBLICATIONS

Bocci, M., Ed et al. RFC5586, "MPLS Generic Associated Channel", Jun. 2009. 19 pages.

Bryant, S., et al: "RFC 6391—Flow-Aware Transport of Pseudowires over an MPLS Packet Switched Network", Nov. 2, 2011, XP055582889, 20 pages.

Filsfils, C., Ed.et al. "Segment Routing Architecture," draft-ietf-spring-segment-routing-08, Network Working Group. May 11, 2016. 24 pages.

Finn, N. et al. "Deterministic Networking Problem Statement," drafl-ietf-detnet-problem-statement-00, Apr. 4, 2016. 15 pages.

Grossman, E., Ed. et al. "Deterministic Networking Use Cases," draft-ietf-detnet-use-cases-10, Jul. 4, 2016. 72 pages.

Gunther, C., Ed. et al, "Deterministic Networking Professional Audio Requirements," draft-gunther-detnet-proaudio-req-01. Internet Engineering Task Force Internet-Draft Intended status: Informational, Mar. 31, 2015, 12 pages.

IEEE 1588V2,IEEE Std 1588-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9),dated Jul. 24, 2008,total 289 pages.

IEEE 802.1Qbv-2015, IEEE Standard for Local and metropolitan area networks—Bridges and Bridged Networks Amendment 25: Enhancements for Scheduled Traffic. 2015. 57 pages.

Rosen, E., et al., "Multiprotocol Label Switching Architecture," RFC 3031, Jan. 2001, 61 pages.

* cited by examiner

METHOD AND APPARATUS FOR PROCESSING LOW-LATENCY SERVICE FLOW

CROSS-REFERENCE TO RELATED APPLICATIONS

This application is a continuation of U.S. patent application Ser. No. 16/285,913, filed on Feb. 26, 2019, now U.S. Pat. No. 10,972,398, which is a continuation of International Patent Application No. PCT/CN2017/088695 filed on Jun. 16, 2017, which claims priority to Chinese Patent Application No. 201610743336.6 filed on Aug. 27, 2016. All of the aforementioned patent applications are hereby incorporated by reference in their entireties.

TECHNICAL FIELD

This application relates to the communications field, and in particular, to a method and an apparatus for processing a low-latency service flow.

BACKGROUND

With popularity of high-definition videos on demand and emergence of vehicle to vehicle (V2V) networks, a growing number of services require a relatively low latency in network transmission. Low-latency service flows arise with emergence and development of the foregoing services. A low-latency service flow is a service flow that requires a transmission latency to fall within a preset threshold. Generally, the preset threshold of the low-latency service flow is relatively small, for example, at a millisecond level.

Currently, a device in an Ethernet network may meet a latency requirement of a low-latency service flow by statically configuring a gate control list by a management plane. For example, eight queues are configured for each Ethernet port of the device in the Ethernet network, and to-be-sent packets are stored in each queue in a sequence of receiving packets. Each queue corresponds to one gate that is configured to control packet sending. That is, eight gates are further configured for each Ethernet port. One gate control list is configured for each Ethernet port. The gate control list includes many entries, and each entry includes eight gating values. The eight gates included by the Ethernet port can be opened or closed based on the eight gating values included in each entry. When a gate is opened, a sending action is performed on to-be-sent packets in a queue that corresponds to the opened gate. To process low-latency service flows using a gate control list, a gate control list needs to be configured for each Ethernet port, resulting in complex and inflexible management.

SUMMARY

In view of this, embodiments of this application provide a method and an apparatus for processing a low-latency service flow to help reduce management complexity and improve control flexibility.

Technical solutions provided in the embodiments of this application are as follows.

According to a first aspect, a method for processing a low-latency service flow is provided, including obtaining, by a first forwarding device, a low latency identifier corresponding to the first service flow after determining that a received first data packet belongs to a first service flow, where the first forwarding device is a device that serves as a network ingress, obtaining, by the first forwarding device, a second data packet based on the first data packet and the low latency identifier, where the second data packet includes the first data packet and the low latency identifier, the low latency identifier is used to instruct a forwarding device that receives the first service flow to forward the first service flow in a low-latency forwarding mode, and the low-latency forwarding mode is a mode in which fast forwarding of the first service flow is implemented under dynamic control, and sending, by the first forwarding device, the second data packet to a second forwarding device in the low-latency forwarding mode.

The low-latency service flow is a service flow that requires a transmission latency to fall within preset duration. Generally, the preset duration is relatively short, for example, at a millisecond level, which may be 10 milliseconds (ms) or 5 ms. The transmission latency is an end-to-end transmission latency required by a network. The low-latency service flow may include one or more Internet Protocol (IP) packets, or the low-latency service flow may include one or more Ethernet frames.

The low-latency forwarding mode is a mode in which configuration is implemented through an instruction or an information exchange. The dynamic control is to control a status of the low-latency forwarding mode through an instruction or an information exchange. The low-latency forwarding mode is a mode that helps ensure that a low-latency service flow can be preferentially processed and fast forwarded. For example, a low-latency service flow in a queue corresponding to a gate is preferentially processed using a timeslot gating function. The timeslot gating function is a function of controlling opening or closing of the gate within a preset time period.

Optionally, the low latency identifier is further used to identify a data packet that belongs to the first service flow. For example, the low latency identifier may be used to identify that the second data packet belongs to the first service flow.

In the method provided in this embodiment of this application, the first forwarding device inserts the low latency identifier corresponding to the first service flow into a received data packet that belongs to the first service flow, for example, inserts the low latency identifier corresponding to the first service flow into the first data packet of the first service flow, to obtain the second data packet. The first forwarding device forwards the second data packet in the low-latency forwarding mode to help accelerate forwarding of a data packet that belongs to the low-latency service flow. The first forwarding device may forward the first service flow based on the status of the low-latency forwarding mode, and no gate control list needs to be configured for each port of the first forwarding device to help reduce management complexity and improve control flexibility.

The first forwarding device may add the low latency identifier to one or more data packets included in the first service flow. That is, after the one or more data packets included in the first service flow are processed by the first forwarding device, the one or more data packets may include a same low latency identifier. In this way, a device configuration in a forwarding path used to forward the first service flow is simplified, and this helps fast identify and process data packets that belong to a same service flow. The first data packet may be the first data packet of the first service flow, or the last data packet of the first service flow, or any data packet in the first service flow except the first data packet and the last data packet.

Optionally, before determining, by a first forwarding device, that a received first data packet belongs to a first service flow, the method further includes receiving, by the first forwarding device, the first data packet, determining, by the first forwarding device, whether the first data packet belongs to the first service flow, and determining, by the first forwarding device based on a result of the determining, that the first data packet belongs to the first service flow.

Determining, by the first forwarding device, whether the first data packet belongs to the first service flow includes that the first forwarding device may determine, based on a port that receives the first data packet or information carried in the first data packet, whether the first data packet belongs to the first service flow. For example, the first forwarding device may store a characteristic information table of the first service flow, and the characteristic information table may include characteristic information used to determine that a data packet belongs to the first service flow. The characteristic information includes one or more pieces of information of a Media Access Control (MAC) address, an IP address, an application layer port number, virtual local area network (VLAN) information, virtual extensible local area network (VXLAN) information, and a physical layer port number. The first forwarding device may query the characteristic information table using the information carried in the first data packet or the port that receives the first data packet. If the characteristic information table has characteristic information that is the same as the information carried in the first data packet, or if the characteristic information table has a physical port matching the port that receives the first data packet, the first forwarding device determines that the first data packet belongs to the first service flow. The first service flow is a low-latency service flow.

The first data packet received by the first forwarding device may be the first data packet from a user that is forwarded by a customer edge (CE). The first forwarding device is a device that serves as a network ingress. For example, the first forwarding device may be an ingress provider edge (PE) device. The second forwarding device may be a device in a forwarding path. For example, the second forwarding device may be a transit provider (P) device. Alternatively, the second forwarding device may be a device that serves as a network egress. For example, the second forwarding device may be an egress PE device. The first forwarding device and the second forwarding device may be located in a same forwarding path, and the forwarding path is the path used to forward the first service flow.

Optionally, before sending, by the first forwarding device, the second data packet to a second forwarding device in the low-latency forwarding mode, the method further includes sending, by the first forwarding device, control information to the second forwarding device, where the control information is used to control a status of the low-latency forwarding mode. Optionally, the control information may correspond to the first service flow, and the low-latency forwarding mode is a forwarding mode corresponding to the first service flow.

Controlling a status of the low-latency forwarding mode includes controlling enabling and disabling of the low-latency forwarding mode. The control information includes a start moment and an end moment of the low-latency forwarding mode, or the control information includes a start moment and a runtime of the low-latency forwarding mode. Optionally, controlling a status of the low-latency forwarding mode includes controlling enabling of the low-latency forwarding mode. For example, the control information includes an enabling identifier, and the enabling identifier is used to identify enabling of the low-latency forwarding mode. In this way, the first forwarding device sends the control information to the second forwarding device before processing the first service flow, omitting a relatively complex configuration operation on a management plane. In addition, the low-latency service flow can be processed more flexibly.

If the control information includes the enabling identifier, after the sending, by the first forwarding device, the second data packet to a second forwarding device in the low-latency forwarding mode, the method further includes sending, by the first forwarding device, a disabling identifier to the second forwarding device, where the disabling identifier is used to identify disabling of the low-latency forwarding mode.

Optionally, the control information may be carried in a Resource Reservation Protocol (RSVP) message or a generic associated channel header (G-ACH) channel message. For example, the control information may be carried in an extended type-length-value (TLV) included in the RSVP message or the G-ACH channel message.

Optionally, before sending, by the first forwarding device, the second data packet to a second forwarding device in the low-latency forwarding mode, the method further includes sending, by the first forwarding device, a detection packet to the second forwarding device, where the detection packet includes a first latency value and a second latency value, the first latency value is maximum allowed latency duration of a forwarding device in the forwarding path, and the second latency value is latency duration generated by the first forwarding device. The detection packet is used to obtain a transmission latency that is generated by the forwarding device in the forwarding path of the first service flow.

Optionally, the first forwarding device may send the detection packet to the second forwarding device after the first forwarding device sends the control information to the second forwarding device. The second forwarding device belongs to the forwarding path used to forward the first service flow. In this way, the first forwarding device sets the start moment of the low-latency forwarding mode for a forwarding device included in the forwarding path, and then sends the detection packet, to detect a transmission latency of a forwarding device that is set to be in a state of the low-latency forwarding mode, helping locate a forwarding device with a relatively long transmission latency based on a detection result, thereby further reducing an end-to-end transmission latency.

Optionally, the control information that is sent by the first forwarding device to the second forwarding device further includes a bandwidth requirement of the first service flow. In this way, the first forwarding device may send the control information such that the second forwarding device pre-allocates a corresponding second forwarding resource based on the bandwidth requirement of the first service flow, and a message for allocating a forwarding resource does not need to be sent.

Optionally, the low latency identifier may be a low latency label. For example, a Multiprotocol Label Switching (MPS) label that is generally used for forwarding is extended to have a function of a low latency identifier and a forwarding function. Alternatively, a low latency label that is not discarded or replaced in a process of forwarding a data packet is added to the data packet.

According to a second aspect, a method for processing a low-latency service flow is provided, including receiving, by a second forwarding device, a second data packet from a first forwarding device, where the second data packet includes a low latency identifier, the low latency identifier is used to instruct a forwarding device that receives a first service flow to forward the first service flow in a low-latency forwarding mode, the low-latency forwarding mode is a mode in which the first service flow is implemented under dynamic control, and the second data packet belongs to the first service flow, and processing, by the second forwarding device, the second data packet in the low-latency forwarding mode based on the low latency identifier.

In the method provided in this embodiment of this application, the second forwarding device may determine, based on whether the low latency identifier is included in a received data packet, whether to send the received data packet in the low-latency forwarding mode, and no complex configuration operation needs to be performed using a management plane. In addition, the low-latency forwarding mode runs more flexibly.

The second data packet further includes a first data packet. If the second forwarding device is an egress PE device, the processing, by the second forwarding device, the second data packet in the low-latency forwarding mode based on the low latency identifier includes removing, by the second forwarding device, the low latency identifier from the second data packet to obtain the first data packet, and sending, by the second forwarding device in the low-latency forwarding mode based on the low latency identifier, the first data packet to a CE device that communicates with the second forwarding device.

If the second forwarding device is a transit P device, processing, by the second forwarding device, the second data packet in the low-latency forwarding mode based on the low latency identifier includes sending, by the second forwarding device, the second data packet to a third forwarding device in the low-latency forwarding mode based on the low latency identifier. The third forwarding device is a next hop of the second forwarding device along a first direction in a forwarding path. The forwarding path is a path used to forward the first service flow, and the first direction is a direction from an ingress PE to the egress PE. Optionally, the third forwarding device is another transit P device or another egress PE device.

Optionally, before receiving, by a second forwarding device, a second data packet from a first forwarding device, the method further includes receiving, by the second forwarding device, control information from the first forwarding device, where the control information is used to control a status of the low-latency forwarding mode, and dynamically controlling, by the second forwarding device, the status of the low-latency forwarding mode based on the control information.

Optionally, the control information includes a start moment and an end moment of the low-latency forwarding mode, and the dynamically controlling, by the second forwarding device, the status of the low-latency forwarding mode based on the control information includes running, by the second forwarding device, the low-latency forwarding mode based on the start moment and the end moment of the low-latency forwarding mode.

Optionally, the control information includes a start moment and a runtime of the low-latency forwarding mode, and dynamically controlling, by the second forwarding device, the status of the low-latency forwarding mode based on the control information includes running, by the second forwarding device, the low-latency forwarding mode based on the start moment and the runtime of the low-latency forwarding mode.

Optionally, the control information includes an enabling identifier, and the enabling identifier is used to identify enabling of the low-latency forwarding mode, and after sending, by the second forwarding device, the second data packet in the low-latency forwarding mode based on the low latency identifier, the method further includes receiving, by the second forwarding device, a disabling identifier sent by the first forwarding device, where the disabling identifier is used to identify disabling of the low-latency forwarding mode, and stopping, by the second forwarding device based on the disabling identifier, sending a data packet of the first service flow in the low-latency forwarding mode.

The stopping sending a data packet of the first service flow in the low-latency forwarding mode may be not forwarding the data packet of the first service flow. Alternatively, stop sending a data packet of the first service flow in the low-latency forwarding mode may be sending the data packet of the first service flow in a common manner, to be specific, no longer preferentially processing the data packet of the first service flow.

Optionally, a manner of sending the control information is the same as that of the first aspect, and details are not described herein again.

Optionally, the method further includes receiving, by the second forwarding device, a first detection packet from the first forwarding device, where the first detection packet includes a first latency value and a second latency value, the first detection packet is used to obtain a transmission latency that is generated by a forwarding device in the forwarding path, the first latency value is maximum allowed latency duration of the forwarding device in the forwarding path, and the second latency value is latency duration generated by the first forwarding device, obtaining, by the second forwarding device, a third latency value, where the third latency value is duration from a time when the second forwarding device receives the first detection packet to a time when the second forwarding device sends the first detection packet, and obtaining, by the second forwarding device, a second detection packet based on the first detection packet and the third latency value, where the second detection packet includes the first detection packet and the third latency value.

The second forwarding device in this embodiment of this application may simulate a transmission latency of a data packet based on a received detection packet from the first forwarding device, for example, the first detection packet, and add, to the first detection packet, a transmission latency that is generated by forwarding the first detection packet to obtain the second detection packet. In this way, a device that receives the second detection packet may locate a forwarding device with a relatively long transmission latency based on information and/or a parameter carried in the second detection packet, helping further reducing an end-to-end transmission latency.

Optionally, the second forwarding device is a transit P device, and the method further includes sending, by the second forwarding device, the second detection packet to the third forwarding device, where the third forwarding device is a next hop of the second forwarding device in the forwarding path.

According to a third aspect, a first forwarding device is provided. The first forwarding device includes a processing unit configured to obtain a low latency identifier corresponding to the first service flow after determining that a received first data packet belongs to a first service flow, where the first forwarding device is a device that serves as a network ingress, an obtaining unit configured to obtain a second data packet based on the first data packet and the low latency identifier, where the second data packet includes the first data packet and the low latency identifier, the low latency identifier is used to instruct a forwarding device that receives the first service flow to forward the first service flow in a low-latency forwarding mode, and the low-latency forwarding mode is a mode in which fast forwarding of the first service flow is implemented under dynamic control, and a first sending unit configured to send the second data packet to a second forwarding device in the low-latency forwarding mode.

Optionally, the first forwarding device further includes a second sending unit configured to send control information to the second forwarding device, where the control information is used to control a status of the low-latency forwarding mode.

The second sending unit may send the control information to the second forwarding device before the first sending unit sends the second data packet to the second forwarding device in the low-latency forwarding mode. In this way, if the first data packet is the first data packet of the first service flow, the first forwarding device only needs to send the control information that is used to control the status of the low-latency forwarding mode to the second forwarding device before sending the second data packet that includes the first data packet such that the low-latency forwarding mode is configured more flexibly.

Optionally, the control information includes a start moment and an end moment of the low-latency forwarding mode, or the control information includes a start moment and a runtime of the low-latency forwarding mode.

Optionally, the control information includes an enabling identifier, and the enabling identifier is used to identify enabling of the low-latency forwarding mode, and the first forwarding device further includes a third sending unit configured to send a disabling identifier to the second forwarding device, where the disabling identifier is used to identify disabling of the low-latency forwarding mode.

Optionally, the first forwarding device further includes a fourth sending unit configured to send a detection packet to the second forwarding device, where the detection packet includes a first latency value and a second latency value, the first latency value is maximum allowed latency duration of a forwarding device in a forwarding path, and the second latency value is latency duration generated by the first forwarding device. The detection packet is used to obtain a transmission latency that is generated by the forwarding device in the forwarding path. The forwarding path includes the first forwarding device and the second forwarding device, and the forwarding path is a path used to forward the first service flow.

Optionally, the detection packet further includes a moment at which the first forwarding device sends the detection packet. In this way, a forwarding device that serves as a network egress may determine, based on the moment at which the first forwarding device sends the detection packet, a moment at which the forwarding device that serves as the network egress receives the detection packet, and a latency value generated by the forwarding device that is carried in the detection packet, the latency value generated by the forwarding device and a latency value generated by a physical link in the forwarding path, helping locate a forwarding device and/or a physical link with a relatively large latency value.

The first forwarding device according to any one of the third aspect or the possible implementations of the third aspect may use the method provided in any one of the first aspect or the possible implementations of the first aspect.

According to a fourth aspect, a second forwarding device is provided. The second forwarding device includes a first receiving unit configured to receive a second data packet from a first forwarding device, where the second data packet includes a low latency identifier, the low latency identifier is used to instruct a forwarding device that receives a first service flow to forward the first service flow in a low-latency forwarding mode, the low-latency forwarding mode is a mode in which fast forwarding of the first service flow is implemented under dynamic control, and the second data packet belongs to the first service flow, and a first sending unit configured to process the second data packet in the low-latency forwarding mode based on the low latency identifier.

Optionally, the second forwarding device further includes a second receiving unit configured to receive control information from the first forwarding device, where the control information is used to control a status of the low-latency forwarding mode, and a control unit configured to dynamically control the status of the low-latency forwarding mode based on the control information.

The second receiving unit only needs to receive the control information before the first receiving unit receives the second data packet. In this way, the control unit can dynamically control the status of the low-latency forwarding mode before the first receiving unit receives the second data packet, for example, enable the low-latency forwarding mode.

Optionally, the control information includes a start moment and an end moment of the low-latency forwarding mode, and the control unit is further configured to run the low-latency forwarding mode based on the start moment and the end moment of the low-latency forwarding mode.

Optionally, the control information includes a start moment and a runtime of the low-latency forwarding mode, and the control unit is further configured to run the low-latency forwarding mode based on the start moment and the runtime of the low-latency forwarding mode.

Optionally, the control information includes an enabling identifier, and the enabling identifier is used to identify enabling of the low-latency forwarding mode, and the second forwarding device further includes a third receiving unit configured to receive a disabling identifier sent by the first forwarding device, where the disabling identifier is used to identify disabling of the low-latency forwarding mode, where the control unit is further configured to stop, based on the disabling identifier, sending of a data packet of the first service flow in the low-latency forwarding mode.

Optionally, the second forwarding device further includes a fourth receiving unit configured to receive a first detection packet from the first forwarding device, where the first detection packet includes a first latency value and a second latency value, the first detection packet is used to obtain a transmission latency that is generated by a forwarding device in a forwarding path, the first latency value is maximum allowed latency duration of the forwarding device in the forwarding path, and the second latency value is latency duration generated by the first forwarding device, a first obtaining unit configured to obtain a third latency value, where the third latency value is duration from a time when the second forwarding device receives the first detection packet to a time when the second forwarding device sends the first detection packet, and a second obtaining unit configured to obtain a second detection packet based on the first detection packet and the third latency value, where the second detection packet includes the first detection packet and the third latency value.

Optionally, the second forwarding device is an intermediate forwarding device, and the first sending unit is further configured to send the second detection packet to a third forwarding device, where the third forwarding device is a next hop of the second forwarding device along a first direction in the forwarding path, and the first direction is a direction from the first forwarding device to a device that serves as a network egress.

The second forwarding device according to any one of the fourth aspect or the possible implementations of the fourth aspect may use the method provided in any one of the second aspect or the possible implementations of the second aspect.

According to a fifth aspect, a first forwarding device is provided. The first forwarding device includes a processor, a memory, and a communications interface. The processor, the memory, and the communications interface are connected using a communications bus. The memory is configured to store a program. The processor performs, based on an executable instruction included in the program read from the memory, the method according to any one of the first aspect or the possible implementations of the first aspect.

Optionally, the first forwarding device provided in the fifth aspect may be the first forwarding device provided in the third aspect.

According to a sixth aspect, a second forwarding device is provided. The second forwarding device includes a processor, a memory, and a communications interface. The processor, the memory, and the communications interface are connected using a communications bus. The memory is configured to store a program. The processor performs, based on an executable instruction included in the program read from the memory, the method according to any one of the second aspect or the possible implementations of the second aspect.

According to a seventh aspect, a system for processing a low-latency service flow is provided. The system includes the first forwarding device according to any one of the third aspect or the possible implementations of the third aspect, and the second forwarding device according to any one of the fourth aspect or the possible implementations of the fourth aspect. Alternatively, the system includes the first forwarding device according to any one of the fifth aspect or the possible implementations of the fifth aspect, and the second forwarding device according to any one of the sixth aspect or the possible implementations of the sixth aspect.

DESCRIPTION OF EMBODIMENTS

The following clearly describes the technical solutions in the embodiments of this application with reference to the accompanying drawings in the embodiments of this application.

Figure 1:
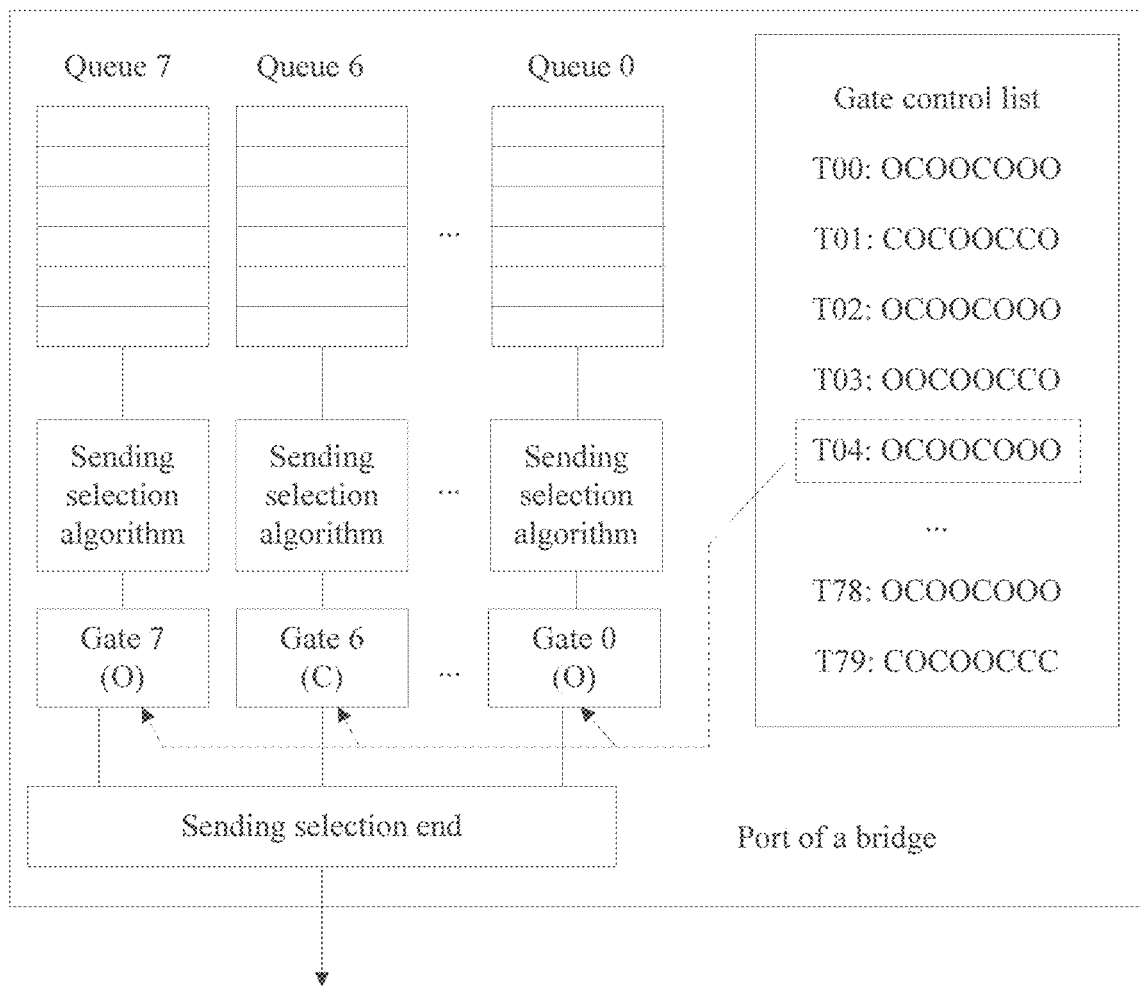
FIG. 1 is a schematic diagram of a port of a bridge.

FIG. 1 is a schematic diagram of a port of a bridge. As shown in FIG. 1, the port of the bridge includes eight queues and eight gates. The eight queues include a queue 0, a queue 1, a queue 2, a queue 3, a queue 4, a queue 5, a queue 6, and a queue 7. The eight gates include a gate 0, a gate 1, a gate 2, a gate 3, a gate 4, a gate 5, a gate 6, and a gate 7. Each queue corresponds to a sending selection algorithm. The sending selection algorithm is used to calculate priorities of to-be-sent service flows in a queue, and output a service flow to a corresponding gate based on the priorities. A gate control list is configured for the port of the bridge, and the gate control list includes 80 gate control entries, such as T00, T01, T02, . . . , T78, and T79. Each gate control entry is used to store a gating signal in a specified timeslot. Each bit of the gating signal is used to control a corresponding gate to open or close. For example, C in FIG. 1 indicates closing, and O in FIG. 1 indicates opening. As shown in FIG. 1, when T04 in the gate control list is loaded to the eight gates, a gating signal included in T04 is OCOOCOOO. That is, the gate 7 is opened, the gate 6 is closed, the gate 5 is opened, the gate 4 is opened, the gate 3 is closed, the gate 2 is opened, the gate 1 is opened, and the gate 0 is opened. After a service flow with a high priority in the queue 7 is selected using the sending selection algorithm, the service flow with the high priority in the queue 7 is output to the gate 7. Because the gate 7 is in an open state based on the corresponding gating signal of T04, the service flow with the high priority in the queue 7 is output. After a service flow with a high priority in the queue 6 is selected using the sending selection algorithm, the service flow with the high priority in the queue 6 is output to the gate 6. Because the gate 6 is in a closed state based on the corresponding gating signal of T04, the service flow with the high priority in the queue 6 is stopped from being output. Processing manners of service flows in the queue 5, the queue 4, . . . , the queue 1, and the queue 0 in the port of the bridge are the same as those of the queue 6 and the queue 7, and details are not described herein again.

Generally, to implement processing of a low-latency service, a port of a bridge is generally configured based on FIG. 1. A gate control list needs to be configured, using a management plane, for each port associated with a low-latency service in a bridge, and this increases management complexity. Because a quantity of gate control entries included in the gate control list is limited, a corresponding configuration may further need to be performed based on service flows before the gate control entries are all used, resulting in relatively poor flexibility.

In view of the foregoing problems, this application provides a method for reducing management complexity and improving control flexibility. In the method, a first forwarding device that serves as a network ingress performs determining on a received first data packet. After determining that the first data packet belongs to a first service flow the first forwarding device obtains a second data packet based on the first data packet and a low latency identifier corresponding to the first service flow. The first forwarding device sends the second data packet to a second forwarding device in a low-latency forwarding mode. The second forwarding device sends the second data packet in the low-latency forwarding mode based on the low latency identifier included in the second data packet. The low-latency forwarding mode is a mode in which fast forwarding of the first service flow is implemented under dynamic control. The solution may be implemented in the following several embodiments.

A low-latency service flow in the embodiments of this application is a service flow that requires a transmission latency to fall within preset duration. Generally, the preset duration is relatively short, for example, at a millisecond level, and may be 5 ms or 10 ms. The transmission latency is a latency generated in an end-to-end transmission process of a network. In this application, end-to-end transmission in the network is transmission between a device that serves as a network ingress and a device that serves as a network egress, or end-to-end transmission in the network is transmission between a source address of a packet and a destination address of the packet. The low-latency service flow may include one or more IP packets, or the low-latency service flow may include one or more Ethernet frames. The low-latency forwarding mode in the embodiments of this application is a mode in which fast forwarding of the first service flow is implemented under dynamic control, helping ensure that a low-latency service flow can be preferentially processed. For example, a low-latency service flow in a corresponding queue is preferentially processed using a timeslot gating function. The timeslot gating function is a function of controlling, within a preset time period, opening or closing of a gate. The gate may be used to transmit a service flow in a queue corresponding to the gate. The preferential processing includes preferential scheduling and preferential forwarding.

"Embodiment 1" to "Embodiment 10" described below are only used to distinguish the embodiments, and do not indicate that some embodiments are better than the other embodiments.

Figure 2:
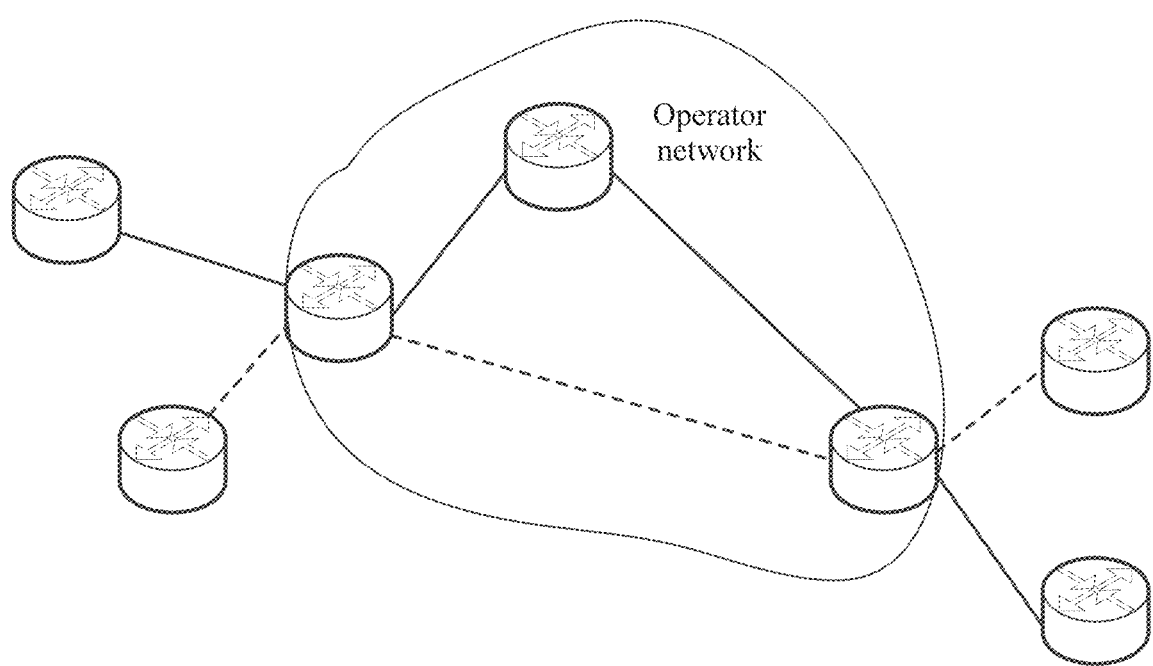
FIG. 2 is a schematic diagram of a network scenario according to an embodiment of this application.

FIG. 2 is a schematic diagram of a network scenario according to an embodiment of this application. The following describes, with reference to FIG. 2, the network scenario provided in this embodiment of this application. A CE 1, a CE 2, a CE 3, and a CE 4 are devices that can communicate with users. A PE 1 can communicate with the CE 1, the CE 2, and a P 1. The P 1 can communicate with a PE 2. The PE 2 can communicate with the CE 3 and the CE 4. The CE 1 sends a first service flow to the CE 3. A solid line in FIG. 2 represents a path used to forward the first service flow. The path used to forward the first service flow is a first forwarding path. The CE 2 sends a second service flow to the CE 4. A dashed line in FIG. 2 represents a path used to forward the second service flow. The path used to forward the second service flow is a second forwarding path. Both the first service flow and the second service flow are low-latency service flows. The PE 1 may be an ingress node of the first forwarding path and an ingress node of the second forwarding path. The PE 2 may be an egress node of the first forwarding path and an egress node of the second forwarding path. The PE 1, the PE 2, and the P 1 in FIG. 2 are devices in an operator network.

Any CE in FIG. 2 may be a broadband access client, an egress gateway of an enterprise, or an egress gateway of a data center (DC). Any PE in FIG. 2 may be a router or a packet transport network (PTN) device. Any P in FIG. 2 may be a router or a PTN device. A link between any CE in FIG. 2 and an adjacent PE that can communicate with the CE may be an Ethernet link, a passive optical network (PON) link, or an x digital subscriber line (xDSL) link. For example, a link between the CE 1 and the PE 1, a link between the CE 2 and the PE 1, a link between the CE 3 and the PE 2, and a link between the CE 4 and the PE 2 may be Ethernet links, PON links, or xDSL links. Examples of combinations formed by different links are not described herein.

Embodiment 1

Figure 3:
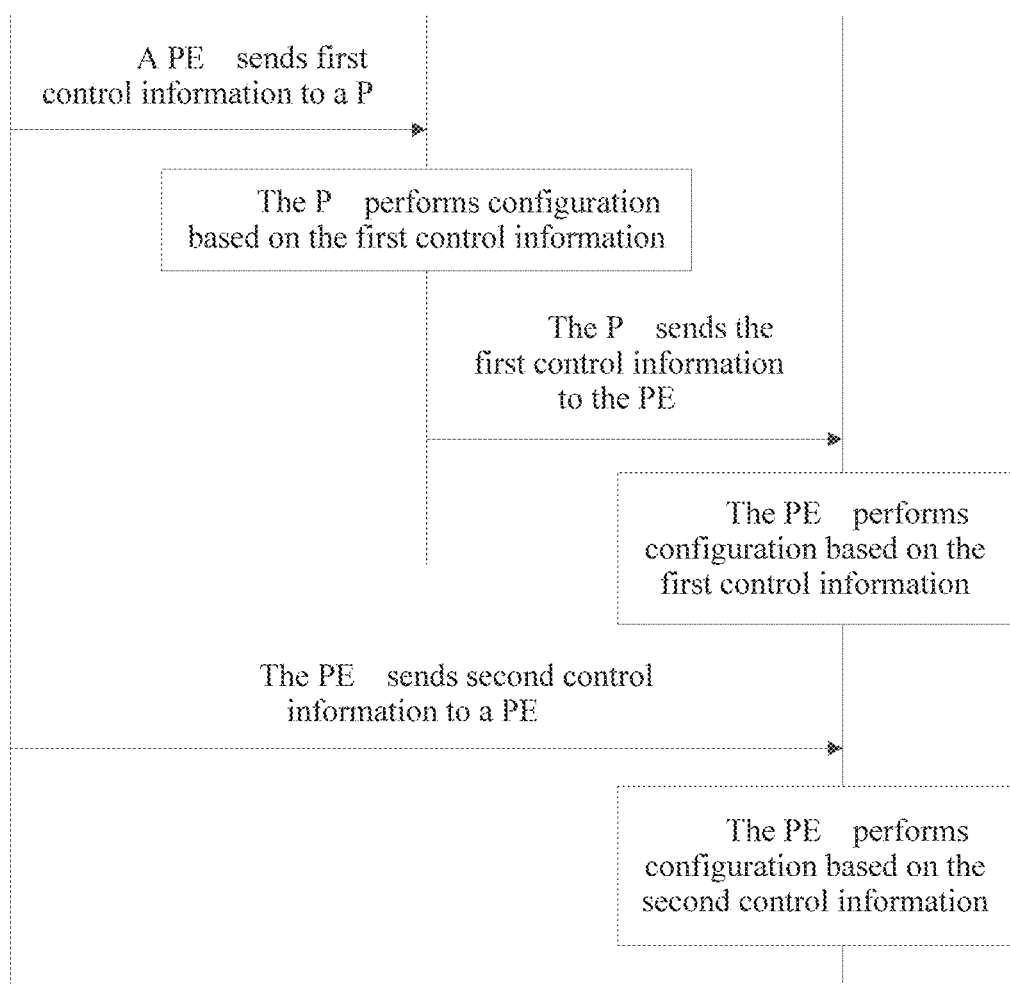
FIG. 3 is a flowchart of a method for configuring a low-latency service forwarding mode according to Embodiment 1 of this application.

FIG. 3 is a flowchart of a method for configuring a low-latency service forwarding mode according to Embodiment 1 of this application. In Embodiment 1 of this application, a method for processing a low-latency service flow is described from a perspective of configuring the low-latency forwarding mode for a device in a forwarding path. A time synchronization protocol needs to be pre-deployed for all devices in an operator network in FIG. 2, for example, the 1588 clock synchronization protocol of the Institute of Electrical and Electronics Engineers (IEEE), namely, IEEE 1588v2 such that all the devices in the operator network have a network-wide synchronized time. Optionally, a frequency synchronization protocol may further be pre-deployed for all the devices in the operator network in FIG. 2, for example, a Synchronous Ethernet (SyncE) protocol such that all the devices in the operator network have a network-wide synchronized frequency protocol. In this embodiment of this application, before the low-latency forwarding mode is configured on a forwarding device in an operator network, time synchronization may be performed using the clock synchronization protocol, and frequency synchronization may be further performed using the frequency synchronization protocol. In this embodiment of this application, a method for performing clock synchronization and/or frequency synchronization on each device in the operator network is not described. An ingress node in this embodiment of this application is an ingress of a forwarding path used to forward a service flow in the operator network, for example, a PE 1. An egress node is an egress of a forwarding path used to forward a service flow in the operator network, for example, a PE 2.

The method provided in Embodiment 1 of this application includes a process of configuring a first low-latency forwarding mode and a process of configuring a second low-latency forwarding mode. The following describes the method for configuring a low-latency service forwarding mode according to Embodiment 1 of this application with reference to FIG. 2 and FIG. 3.

Step 301. The PE 1 sends first control information to a P 1.

For example, the first control information is used to control a status of the first low-latency forwarding mode. The first low-latency forwarding mode is a low-latency forwarding mode that is used by a device for processing a first service flow. The first low-latency forwarding mode corresponds to the first service flow. The first low-latency forwarding mode is a mode in which fast forwarding of the first service flow is implemented under dynamic control. The device for processing the first service flow may be a forwarding device for processing the first service flow in the operator network in FIG. 2. For the operator network in Embodiment 1, the first low-latency forwarding mode is configured on the PE 1, the P 1, and the PE 2. The status of the first low-latency forwarding mode includes a start of the first low-latency forwarding mode and an end of the first low-latency forwarding mode. Alternatively, the status of the first low-latency forwarding mode includes a start of the first low-latency forwarding mode.

For example, the first control information includes a start moment of the first low-latency forwarding mode and an end moment of the first low-latency forwarding mode. Alternatively, the first control information includes a start moment of the first low-latency forwarding mode and a runtime of the first low-latency forwarding mode. Alternatively, the first control information includes a first enabling identifier. The first enabling identifier is used to instruct a device that obtains the first enabling identifier to enable the first low-latency forwarding mode.

For example, the start moment of the first low-latency forwarding mode may be denoted by T1. The end moment of the first low-latency forwarding mode may be denoted by T2. The runtime of the first low-latency forwarding mode may be denoted by t. A manner of obtaining T1 and T2 may be any one of a manner 1 to a manner 3.

In the manner 1, in an access authentication process, an authentication device obtains T1 and T2 of an authenticated user (which is a user that communicates with a CE 1 and is authenticated), and the PE 1 obtains T1 and T2 from the authentication device. T1 may be set as a moment at which the user is authenticated. A moment in this embodiment of this application is a time point.

In the manner 2, a user purchases a first service on a page provided by a provider. After the user successfully purchases the first service, the PE 1 may obtain T1 and T2 from a server provided by the provider.

In the manner 3, after an application program corresponding to a first service on a user side obtains T1 and T2, the PE 1 obtains T1 and T2 from a user (which communicates with a CE 1). A method for obtaining T1 and T2 from the user by the PE 1 may be that the user actively reports T1 and T2 to the PE 1. The first service flow is a data flow corresponding to the first service. A manner of obtaining T1 and t may be the same as the foregoing manner of obtaining T1 and T2, and details are not described herein.

For example, the PE 1 sends the first control information in a process of establishing a first forwarding path. The first forwarding path is a path used to forward the first service flow. For a method for establishing the first forwarding path by the PE 1, refer to a method provided in Embodiment 10. The P 1 is a device in the first forwarding path. The first control information may be carried in an RSVP message or a G-ACH channel message.

An RSVP message that carries the first control information is used as an example, and the RSVP message may be extended. For example, the RSVP message is extended by a low latency field. For example, a TLV is added. The TIN carried in the low latency field may be used to carry the first control information. Optionally, when the first low-latency forwarding mode further includes a sub forwarding mode, the TLV carried in the low latency field may be further used to carry a first control flag. The first control flag is used to identify enabling or disabling of the sub forwarding mode. The sub forwarding mode may be generally preemption forwarding or timeslot scheduling (timescale scheduling).

Figure 5A:
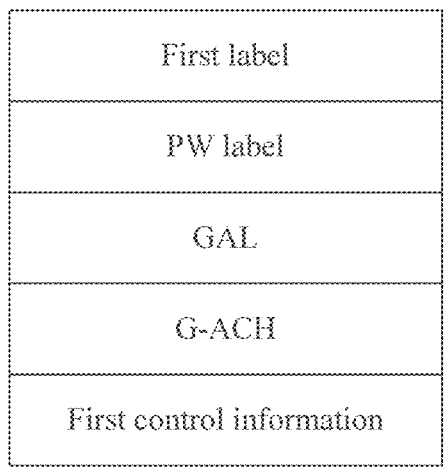
FIG. 5A is a schematic diagram of a first G-ACH channel message according to an embodiment of this application.

A first G-ACH channel message that carries the first control information is used as an example, and the first G-ACH channel message may be extended. For example, an associated channel header (ACH) TLV is added to the first G-ACH channel message, and the ACH TLV may be used to carry the first control information, as shown in FIG. 5A. A generic ACH label (GAL), a pseudo wire (PW) label, and a first label may be successively encapsulated into an outer layer of the first G-ACH channel message. The GAL is used to indicate that a G-ACH control channel exists. The PW label is optional. For example, the PW label needs to be added for some layer 2 services, but does not need to be added for a layer 3 service. In this embodiment of this application, a structure of the first G-ACH channel message that is used to carry the first control information may be shown in FIG. 5A, and is not enumerated in the following embodiments for description. Optionally, when the first low-latency forwarding mode further includes a sub forwarding mode, the ACH TIN may be further used to carry a first control flag. The first control flag is used to identify enabling or disabling of the sub forwarding mode. The sub forwarding mode may usually be preemption forwarding or timescale scheduling.

Step 302. The PE 1 sends second control information to the PE 2.

For example, the second control information is used to control a status of the second low-latency forwarding mode. The second low-latency forwarding mode is a low-latency forwarding mode that is used by a device for processing a second service flow. The second low-latency forwarding mode corresponds to the second service flow. The second low-latency forwarding mode is a mode in which fast forwarding of the second service flow is implemented under dynamic control. The device for processing the second service flow may be a forwarding device for processing the second service flow in the operator network in FIG. 2. For the operator network in Embodiment 1, the second low-latency forwarding mode is further configured on the PE 1 and the PE 2. The status of the second low-latency forwarding mode includes a start and an end of the second low-latency forwarding mode. Alternatively, the status of the second low-latency forwarding mode includes a start of the second low-latency forwarding mode. The start of the second low-latency forwarding mode means enabling of the second low-latency forwarding mode. The end of the second low-latency forwarding mode means disabling of the second low-latency forwarding mode.

For example, the second control information includes a start moment of the second low-latency forwarding mode and an end moment of the second low-latency forwarding mode. Alternatively, the second control information includes a start moment of the second low-latency forwarding mode and a runtime of the second low-latency forwarding mode. Alternatively, the second control information includes a second enabling identifier. The second enabling identifier is used to instruct a device that obtains the second enabling identifier to enable the second low-latency forwarding mode.

For example, the PE 1 sends the second control information in a process of establishing a second forwarding path. The second forwarding path is used to transmit the second service flow. The PE 2 is a device in the second forwarding path, and is also a device that serves as an egress node in the second forwarding path. A manner of sending the second control information is the same as a manner of sending the first control information, and details are not described herein.

An RSVP message that carries the second control information is used as an example, and the RSVP message may be extended. A manner of extending the RSVP message to carry the second control information is the same as a manner of extending the RSVP message to carry the first control information, and details are not described herein.

A second G-ACH channel message that carries the second control information is used as an example, and the second G-ACH channel message may be extended. For example, an ACH TLV included in the second G-ACH channel message may be used to carry the second control information. The manner of extending the second G-ACH channel message to carry the second control information is the same as a manner of extending the first G-ACH channel message, and details are not described herein.

Step 303. The P 1 performs configuration based on the first control information.

For example, the P 1 configures the status of the first low-latency forwarding mode based on the first control information. In an implementation, the P 1 may generate, based on the first control information, an entry corresponding to the first service flow. If the first control information includes the start moment of the first low-latency forwarding mode and the end moment of the first low-latency forwarding mode, the entry corresponding to the first service flow includes a first low latency identifier, the start moment of the first low-latency forwarding mode, and the end moment of the first low-latency forwarding mode. If the first control information includes the start moment of the first low-latency forwarding mode and the runtime of the first low-latency forwarding mode, the entry corresponding to the first service flow includes a first low latency identifier, the start moment of the first low-latency forwarding mode, and the runtime of the first low-latency forwarding mode. The first low latency identifier may be from the first control information, or obtained through static configuration, or obtained from another message that is from the PE 1. In another implementation, the P 1 may generate, based on the first control information, an entry corresponding to the first service. If the entry corresponding to the first service flow further includes an identifier of the first service flow, the entry corresponding to the first service further includes an identifier of the first service. To be specific, the identifier of the first service is used to replace the identifier that is of the first service flow and that is included in the entry corresponding to the first service flow to obtain the entry corresponding to the first service.

Step 304. The P 1 sends the first control information to the PE 2.

For example, the P 1 may send the first control information to the PE 2 along the first forwarding path.

For an execution sequence of steps 301, 302, and 304, it needs to be ensured that step 301 is performed before steps 303 and 304, and an execution sequence of step 302 is not limited, steps 302 and 301 may be performed at the same time, or step 302 may be performed before step 301. Alternatively, steps 302 and 303 may be performed at the same time, or step 302 may be performed after step 303. Alternatively, steps 302 and 304 may be performed at the same time, or step 302 may be performed after step 304. Step 303 may be performed after step 304, or step 303 and step 304 may be performed at the same time.

Step 305. The PE 2 performs configuration based on the first control information.

For example, the PE 2 configures the status of the first low-latency forwarding mode based on the first control information. A manner of configuring the status of the first low-latency forwarding mode by the PE 2 is the same as a configuration manner used by the P 1 in step 303, and details are not described herein. The PE 2 may obtain, using the manner used by the P 1 in step 303, an entry corresponding to the first service flow or obtain an entry corresponding to the first service. The entry that is obtained by the PE 2 and that corresponds to the first service flow may be referred to as a first entry. The entry that is obtained by the PE 2 and that corresponds to the first service flow is the same as the entry that is obtained by the P 1 in step 303 and that corresponds to the first service flow. Alternatively, the entry that is obtained by the PE 2 and that corresponds to the first service may be referred to as a first entry. The entry that is obtained by the PE 2 and that corresponds to the first service is the same as the entry that is obtained by the P 1 in step 303 and that corresponds to the first service.

Step 306. The PE 2 performs configuration based on the second control information.

For example, the PE 2 configures the status of the second low-latency forwarding mode based on the second control information. In an implementation, the PE 2 may generate a second entry based on the second control information, and the second entry is an entry corresponding to the second service flow. If the second control information includes the start moment of the second low-latency forwarding mode and the end moment of the second low-latency forwarding mode, the second entry includes a second low latency identifier, the start moment of the second low-latency forwarding mode, and the end moment of the second low-latency forwarding mode. If the second control information includes the start moment of the second low-latency forwarding mode and the runtime of the second low-latency forwarding mode, the second entry includes a second low latency identifier, the start moment of the second low-latency forwarding mode, and the runtime of the second low-latency forwarding mode. The second low latency identifier may be from the second control information, or obtained through static configuration, or obtained from another message that is from the PE 1. In an implementation, the PE 2 may generate, based on the second control information, an entry corresponding to a second service. The entry corresponding to the second service is the second entry. If the entry corresponding to the second service flow further includes an identifier of the second service flow, an identifier of the second service is used to replace the identifier of the second service flow to obtain the entry corresponding to the second service.

Step 305 is performed after step 304, and step 306 is performed after step 302. A sequence of steps 305 and 306 is not limited. For example, steps 305 and 306 may be performed at the same time, or step 305 is performed after step 306.

In step 301 in which the P 1I sends the first control information to the P 1, optionally, the first control information may further include a first low latency identifier. The first low latency identifier corresponds to the first service flow. The first low latency identifier is used to instruct a forwarding device that receives the first service flow to forward the first service flow in the first low-latency forwarding mode. A specific form of the first low latency identifier is not limited in this embodiment of this application. In this way, the PE 1 may send the first low latency identifier using a message that carries the first control information, reducing a quantity of sent packets in the network, thereby helping saving network resources. Optionally, the PE 1 may further send, along the first forwarding path, a message that carries the first low latency identifier before or after or when sending the first control information.

In step 301 in which the PE 1 sends the first control information to the P 1, optionally, the first control information further includes a bandwidth requirement of the first service flow and an allowed latency value of the first service flow. The allowed latency value of the first service flow is an allowed latency value of a forwarding device in the first forwarding path. In this way, a device that receives the bandwidth requirement of the first service flow and the allowed latency value of the first service flow may allocate a first forwarding resource based on the bandwidth requirement of the first service flow and the allowed latency value of the first service flow. The first forwarding resource is used to process the first service flow. Optionally, the PE 1 may further send, along the first forwarding path, a message that carries the bandwidth requirement of the first service flow and the allowed latency value of the first service flow before or after or when sending the first control information.

In step 302 in which the PE 1 sends the second control information to the PE 2, optionally, the second control information may further include a second low latency identifier. The second low latency identifier corresponds to the second service flow. The second low latency identifier is used to instruct a forwarding device that receives the second service flow to forward the second service flow in the second low-latency forwarding mode. A specific form of the second low latency identifier is not limited in this embodiment of this application. In this way, the PE 1 may send the second low latency identifier using a message that carries the second control information, reducing a quantity of sent packets in the network, thereby helping saving network resources. Optionally, the PE 1 may further send, along the second forwarding path, a message that carries the second low latency identifier before or after or when sending the second control information.

In step 302 in which the PE 1 sends the second control information to the PE 2, optionally, the second control information further includes a bandwidth requirement of the second service flow and an allowed latency value of the second service flow. The allowed latency value of the second service flow is an allowed latency value of a forwarding device in the second forwarding path. In this way, a device that receives the bandwidth requirement of the second service flow and the allowed latency value of the second service flow may allocate a second forwarding resource based on the bandwidth requirement of the second service flow and the allowed latency value of the second service flow. The second forwarding resource is used to process the second service flow. Optionally, the PE 1 may further send, along the second forwarding path, a message that carries the bandwidth requirement of the second service flow and the allowed latency value of the second service flow before or after or when sending the second control information.

In step 303 in which the P 1 performs configuration based on the first control information, optionally, the P 1 may allocate, based on the bandwidth requirement of the first service flow and the allowed latency value of the first service flow that are included in the first control information, the first forwarding resource used to forward the first service flow. For example, the P 1 may allocate a preemptive priority queue that matches the first service flow to the first service flow, to be specific, allocate a leaky bucket that matches the first service flow to the first service flow. The leaky bucket that matches the first service flow is a product of the bandwidth requirement of the first service flow and the allowed latency value of the first service flow. In this way, an actual latency of the first service flow that is generated by the P 1 can be less than the allowed latency value of the first service flow.

In step 303 in which the P 1 performs configuration based on the first control information, optionally, the P 1 may further allocate a credit rate that matches the first service flow to the first service flow. Compared with the bucket that matches the first service flow, the credit rate indicates a total quantity of bytes of data packets that can be sent within the allowed latency value of the first service flow.

In step 305 in which the PE 2 performs configuration based on the first control information, optionally, a manner in which the PE 2 allocates the first forwarding resource used to forward the first service flow is the same as an allocation manner used by the P 1 in step 303, and details are not described herein.

In step 305 in which the PE 2 performs configuration based on the first control information, optionally, the PE 2 may further allocate a credit rate that matches the first service flow to the first service flow, and a specific allocation manner is the same as the allocation manner used by the P 1 in step 303, and details are not described herein.

In step 306 in which the PE 2 performs configuration based on the second control information, optionally, a manner in which the PE 2 allocates the second forwarding resource used to forward the second service flow is the same as a manner in step 303 in which the P 1 allocates the first forwarding resource used to forward the first service flow, and details are not described herein. A leaky bucket that matches the second service flow is a product of the bandwidth requirement of the second service flow and the allowed latency value of the second service flow. In this way, an actual latency of the second service flow that is generated by the PE 2 can be less than the allowed latency value of the second service flow.

In step 306 in which the PE 2 performs configuration based on the second control information, optionally, the PE 2 may further allocate a credit rate that matches the second service flow to the second service flow. Compared with the bucket that matches the second service flow, the credit rate indicates a total quantity of bytes of data packets that can be sent within the allowed latency value of the second service flow.

Optionally, the method provided in Embodiment 1 of this application further includes configuring, by the PE 1, the first low-latency forwarding mode based on the first control information. Before processing the first service flow, the PE 1 configures the first low-latency forwarding mode based on the first control information. A method for configuring the first low-latency forwarding mode by the PE 1 is the same as a configuration method used by the P 1 in 303, and details are not described herein.

Optionally, the method provided in Embodiment 1 of this application further includes configuring, by the PE 1, the second low-latency forwarding mode based on the second control information. Before processing the second service flow, the PE 1 configures the second low-latency forwarding mode based on the second control information. A method for configuring the second low-latency forwarding mode by the PE 1 is the same as a configuration method used by the PE 2 in step 306, and details are not described herein.

Optionally, the first low latency identifier in this embodiment of this application is further used to indicate a data packet that belongs to the first service flow. The second low latency identifier is further used to indicate a data packet that belongs to the second service flow.

In this embodiment of this application, the process of configuring the first low-latency forwarding mode and the process of configuring the second low-latency forwarding mode are mutually independent.

In the method provided in Embodiment 1 of this application, a device that serves as a network ingress, for example, the PE 1, sends the first control information to a device in the first forwarding path such that a device that receives the first control information, for example, the P 1 or the PE 2, configures the status of the first low-latency forwarding mode based on the first control information to complete configuration of the first low-latency forwarding mode. The PE 1 may further send the second control information to a device in the second forwarding path such that a device that receives the second control information, for example, the PE 2, configures the status of the second low-latency forwarding mode based on the second control information to complete configuration of the second low-latency forwarding mode. In the method provided in Embodiment 1 of this application, the device that serves as the network ingress may send the first control information and/or the second control information to dynamically control the low-latency forwarding mode of the device in the forwarding path. No gate control list corresponding to a service flow needs to be configured on the device in the first forwarding path and/or the second forwarding path using the management plane, and maintenance and update operations do not need to be performed on the gate control list, either, helping reduce complexity of the management plane and improve control flexibility.

Embodiment 2

Figure 4:
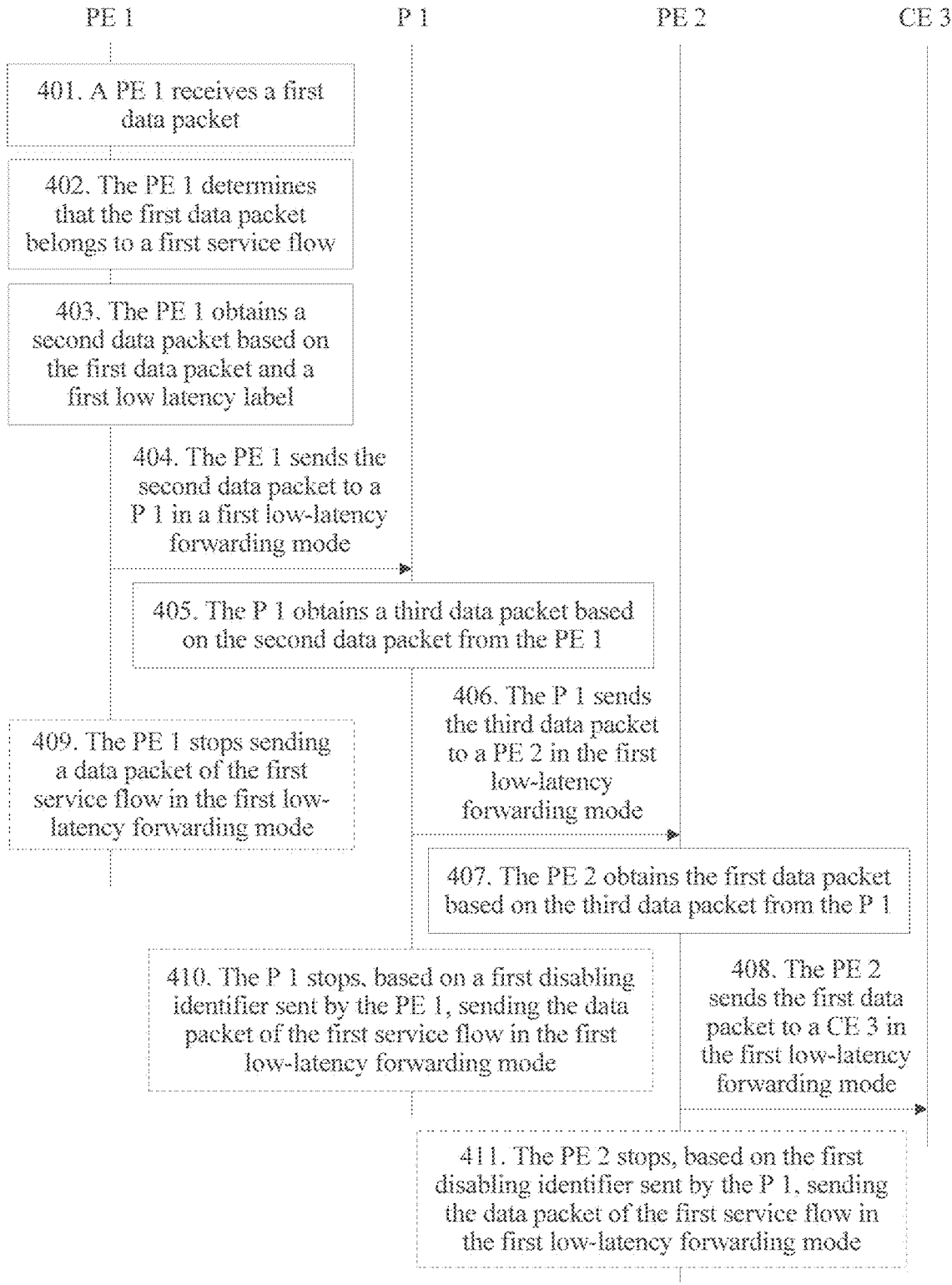
FIG. 4 is a flowchart of a method for processing a low-latency service flow according to Embodiment 2 of this application.

FIG. 4 is a flowchart of a method for processing a low-latency service flow according to Embodiment 2 of this application. In Embodiment 2 of this application, the method for processing a low-latency service flow is described using an example in which an operator network is an MPLS network, and a low-latency service flow is a first service flow. An MPLS protocol runs on the PE 1, the P 1, and the PE 2 in FIG. 2. A first forwarding path used to forward the first service flow is a first label switched path (LSP). A first low latency identifier corresponding to the first service flow is a first low latency label. Before processing the first service flow, the PE 1, the P 1, and the PE 2 complete configuration of a first low-latency forwarding mode. For details, refer to the method provided in Embodiment 1. The method provided in Embodiment 1 may be interwoven with Embodiment 2 to form another embodiment, and no further description is provided for the embodiment that is formed by interweaving Embodiment 1 with Embodiment 2. A label corresponding to the first LSP may be configured on each of the PE 1, the P 1, and the PE 2. The label corresponding to the first LSP is used to forward a packet along the first LSP. For details, refer to Internet Engineering Task Force (IETF) Requests for Comment (RFC) 3209, and a distribution process of the label corresponding to the first LSP is not described in Embodiment 2 of this application. The following describes the method for processing a low-latency service flow according to Embodiment 2 of this application with reference to FIG. 2 and FIG. 4.

Step 401. The PE 1 receives a first data packet.

For example, the PE 1 receives the first data packet using a first port. The first data packet may be from a CE 1. The first data packet includes a first MAC address and a first IP address. The first MAC address is a MAC address of the CE 1. The first IP address is an IP address of the CE 1. The first data packet may further include a second MAC address and a second IP address, and the second MAC address is a MAC address of a CE 3. The second IP address is an IP address of the CE 3. The CE 1 and the CE 3 may belong to a same virtual private network (VPN). The first data packet may be an IP packet or an Ethernet frame.

Optionally, between steps 401 and 402, the method provided in Embodiment 2 of this application further includes determining, by the PE 1, whether the first data packet belongs to the first service flow, and if the first data packet belongs to the first service flow, performing 402 by the PE 1. If the first data packet does not belong to the first service flow, the PE 1 puts the first data packet in a to-be-forwarded queue, and processes, using a common scheduling method, a packet in the to-be-forwarded queue. The common scheduling method may be to perform scheduling in a sequence of enqueue. In this embodiment of this application, the common scheduling method is not enumerated for description.

For example, a manner in which the PE 1 determines whether the first data packet belongs to the first service flow may be any one of a manner 1 to a manner 4.

In the manner 1, a tuple may include one or more of the first port, the first MAC address, the first IP address, the second MAC address, the second IP address, a class of service (CoS), a traffic class (TC), and a Transmission Control Protocol (TCP) port number. The PE 1 may determine, based on the tuple, whether the first data packet belongs to the first service flow. A characteristic information table of the first service flow may be stored on the PE 1. The characteristic information table may include an identifier of the first service flow and characteristic information corresponding to a data packet that belongs to the first service flow. The characteristic information includes one or more of a MAC address, an IP address, an application layer port number, VLAN information, VXLAN information, and a physical layer port number. The VLAN information may include a VLAN identifier (also referred to as ID) and/or a priority. The VXLAN information may include a VXLAN network identifier (VNI). The PE 1 queries the characteristic information table of the first service flow using the tuple. If information that matches the tuple exists in the characteristic information table of the first service flow, the PE 1 determines that the first data packet belongs to the first service flow. The matching means that information that is the same as the tuple exists in the characteristic information table of the first service flow. For example, the tuple includes N pieces of information, where N is an integer greater than or equal to 1, and if information that is the same as the N pieces of information exists in the characteristic information table of the first service flow, the PE 1 may determine that the first data packet belongs to the first service flow.

In the manner 2, the characteristic information table stored on the PE 1 includes an identifier of a first service and characteristic information corresponding to a data packet that belongs to the first service. The characteristic information corresponding to the data packet that belongs to the first service may be the same as the characteristic information corresponding to the data packet that belongs to the first service flow in the manner 1. A method in which the PE 1 determines, based on the characteristic information corresponding to the data packet that belongs to the first service, whether the first data packet belongs to the first service flow is the same as the manner 1. If the first data packet received by the PE 1 includes the characteristic information corresponding to the data packet of the first service flow, the PE 1 determines that the received first data packet belongs to the first service flow.

In the manner 3, the first data packet further includes an identifier of a service flow to which the first data packet belongs. If the identifier of the service flow to which the first data packet belongs is the identifier of the first service flow, the PEI determines that the first data packet belongs to the first service flow.

In the manner 4, the first data packet further includes an identifier of a service to which the first data packet belongs. If the identifier of the service to which the first data packet belongs is the identifier of the first service, the PE 1 determines that the first data packet belongs to the first service. That is, the first data packet belongs to the first service flow. The first service flow is a data flow of the first service.

Step 402. The PE 1 determines that the first data packet belongs to the first service flow.

For example, the PE 1 may obtain the first low latency label after determining that the first data packet belongs to the first service flow. A manner of obtaining the first low latency label by the PE 1 may be any one of a manner 1 to a manner 3.

In the manner 1, the PE 1 may obtain the identifier of the first service flow based on the characteristic information table in step 401 after determining that the first data packet belongs to the first service flow. Alternatively, the first data packet carries the identifier of the first service flow, and the PEI 1 may obtain the identifier of the first service flow from the first data packet. A correspondence between the first low latency label and the identifier of the first service flow is configured on the PE 1. The PE 1 may obtain the first low latency label based on the correspondence and the identifier of the first service flow.

In the manner 2, if the characteristic information table in step 401 includes the identifier of the first service, the PEI 1 may obtain the identifier of the first service after determining that the first data packet belongs to the first service flow. Alternatively, the first data packet carries the identifier of the first service, and the PEI may obtain the identifier of the first service from the first data packet. A correspondence between the first low latency label and the identifier of the first service is configured on the PE 1. The PE 1 may obtain the first low latency label based on the correspondence and the identifier of the first service.

In the manner 3, if only the first low latency label is configured on the PE 1, and the PE 1 is used to forward only the first service flow, the PE 1 directly obtains the first low latency label after determining that the first data packet belongs to the first service flow.

Step 403. The PE 1 obtains a second data packet based on the first data packet and the first low latency label.

For example, the second data packet includes the first data packet. Further, if the first service is a low-latency IP service, the second data packet further includes the first low latency label and a first label. The first low latency label and the first label are encapsulated into an outer layer of the first data packet. The first label is a label that corresponds to the first LSP and that is allocated to the PE 1. The first label is used to instruct the PE 1 to forward a data packet along the first LSP. If the first service is a low-latency service between a plurality of DCs, the second data packet further includes the first low latency label and a first segment routing (SR) label. The first low latency label and the first SR label are encapsulated into the outer layer of the first data packet. In Embodiment 2, the first SR label is used to identify a link between the PE 1 and the P 1. The first label and the first SR label are two forms of labels. Both the first label and the first SR label are used to instruct the PE 1 to forward a data packet.

Figure 5B:
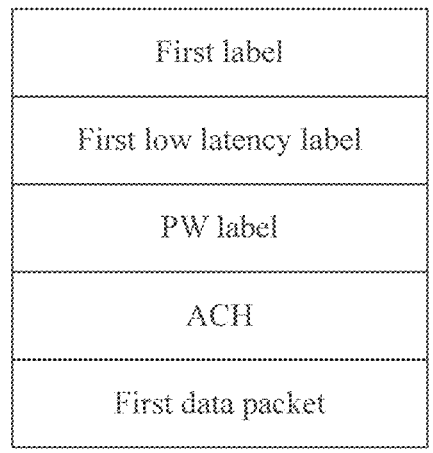
FIG. 5B is a schematic diagram of a second data packet according to an embodiment of this application.
Figure 5C:
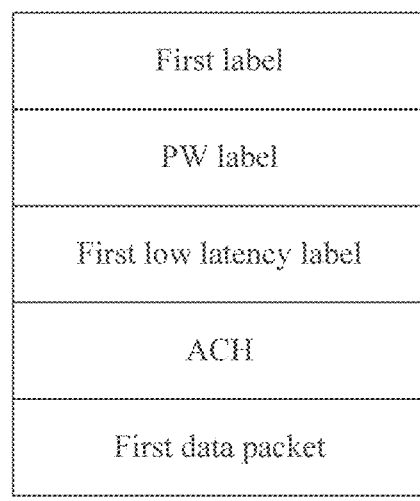
FIG. 5C is a schematic diagram of a second data packet according to an embodiment of this application.

Optionally, if the first service is a low-latency Ethernet service, the second data packet may further include an ACH header and/or a PW label. For example, the PW label needs to be added to some layer 2 services, but does not need to be added for a layer 3 service. The PW label is used to implement layer 2 Ethernet services. FIG. 5B and FIG. 5C are schematic diagrams of possible encapsulation formats used for the second data packet. As shown in FIG. 5B, the first low latency label may be encapsulated between the PW label and the first label. Alternatively, as shown in FIG. 5C, the first low latency label may be encapsulated between the ACH header and the PW label. In this embodiment of this application, no limitation is imposed on a possible location of the first low latency label, provided that forwarding of the second data packet is not affected.

After the PE 1 obtains the second data packet, the PEI 1 sends the second data packet to a to-be-sent queue on the PE 1 based on the first low latency label carried in the second data packet. The to-be-sent queue on the PE 1 is a priority queue that corresponds to the first service flow and that is on the PE 1.

Optionally, the first low latency label may be further used to indicate that the second data packet belongs to the first service flow.

Step 404. The PE 1 sends the second data packet to the P 1 in the first low-latency forwarding mode.

Before step 404, the PE 1 may configure the first low-latency forwarding mode using the method provided in Embodiment 1. In this way, it can be ensured that the PE 1 starts to run the first low-latency forwarding mode before or when the PE sends the second data packet. A gate that is used by the PE 1 to forward the first service flow is in an open state. The PE 1 may not need to configure a common gate control list using a management plane, and the PEI 1 may implement fast processing of a low-latency service based on enabling or disabling of the first low-latency forwarding mode, thereby implementing relatively flexible control and relatively simple management.

For example, that the PE 1 sends the second data packet to the P 1 in the first low-latency forwarding mode includes the PE 1 identifies, in the first low-latency forwarding mode, a packet in the to-be-sent queue on the PE 1 to obtain the second data packet, and the PE 1 preferentially selects, based on the first low latency label included in the second data packet, the second data packet for sending. Optionally, if the PE 1 uses a credit shaping algorithm, after the PE 1 preferentially selects the second data packet for sending, the method further includes reducing, by the PE 1, a value of credit. In an implementation, the to-be-forwarded queue on the PE 1 may further include a plurality of data packets that belong to the first service flow, and the PE may continue to preferentially select the plurality of data packets that belong to the first service flow for sending, until all data packets that belong to the first service flow in the to-be-forwarded queue on the P 1I are sent or the value of credit is reduced to 0.

Step 405. The P 1 obtains a third data packet based on the second data packet from the PE 1.

For example, that the P 1 obtains a third data packet based on the second data packet from the PE 1 includes the P 1 receives the second data packet sent by the PE 1, and the P 1 obtains the third data packet based on the second data packet. If the second data packet includes the first label, the P 1 replaces the first label included in the second data packet with a second label, to obtain the third data packet. The second label is a label that corresponds to the first LSP and that is allocated to the P 1. The second label is used to instruct the P 1 to send the third data packet along the first forwarding path. If a second SR label is used to identify a link between the P 1 and the PE 2, the second data packet includes the first SR label and the second SR label, and the first SR label is located on a top of a label stack included in the second data packet, the P 1 may pop out the first SR label to obtain the third data packet. The second SR label is located on a top of a label stack included in the third data packet. Optionally, if the first SR label may further identify the link between the P 1 and the PE 2, the P 1 does not process the first SR label included in the second data packet, and uses the second data packet as the third data packet. The second label and the second SR label are two forms of labels. Both the second label and the second SR label are used to instruct the P 1 to forward a data packet.

After the P 1 obtains the third data packet, the P 1 sends the third data packet to a to-be-sent queue on the P 1 based on the first low latency label. The to-be-sent queue on the P 1 is a priority queue that corresponds to the first service flow and that is on the P 1.

Step 406. The P 1 sends the third data packet to the PE 2 in the first low-latency forwarding mode.

Before step 406, the P 1 may configure the first low-latency forwarding mode using the method provided in Embodiment 1. In this way, it can be ensured that the P 1 starts to run the first low-latency forwarding mode before or when the P 1 sends the third data packet. A gate that is used by the P 1 to forward the first service flow is in an open state. The P 1 may not need to configure a common gate control list using a management plane, and the P 1 may implement fast processing of a low-latency service based on enabling or disabling of the first low-latency forwarding mode, thereby implementing relatively flexible control and relatively simple management.

For example, that the P 1 sends the third data packet to the PE 2 in the first low-latency forwarding mode includes the P 1 identifies, in the first low-latency forwarding mode, a packet in the to-be-sent queue on the P 1 to obtain the third data packet, and the P 1 preferentially selects, based on the first low latency label included in the third data packet, the third data packet for sending. Optionally, if the P 1 uses a credit shaping algorithm, after the P 1 preferentially selects the third data packet for sending, the method further includes reducing, by the P 1, a value of credit. In an implementation, the to-be-forwarded queue on the P 1 may further include a plurality of data packets that belong to the first service flow, and the P 1 may continue to preferentially select the plurality of data packets that belong to the first service flow for sending, until all data packets that belong to the first service flow in the to-be-forwarded queue on the P 1 are sent or the value of credit is reduced to 0.

Step 407. The PE 2 obtains the first data packet based on the third data packet from the P 1.

For example, that the PE 2 obtains the first data packet based on the third data packet from the P 1 includes the PE 2 receives the third data packet sent by the P 1, and the PE 2 removes the first label and the first low latency label from the third data packet to obtain the first data packet. After the PE 2 obtains the first data packet, the PE 2 sends the first data packet to a to-be-sent queue on the PE 2 based on the first low latency label included in the third data packet. The to-be-sent queue on the PE 2 is a priority queue that corresponds to the first service flow and that is on the PE 2. If the third data packet further includes the PW label and/or the AC header, the PE 2 further removes the PW label and/or the ACH header in a process of obtaining the first data packet based on the third data packet.

Step 408. The PE 2 sends the first data packet to a CE 3 in the first low-latency forwarding mode.

Before step 408, the PE 2 may configure the first low-latency forwarding mode using the method provided in Embodiment 1. In this way, it can be ensured that the PE 2 starts to run the first low-latency forwarding mode before or when the PE 2 sends the first data packet. A gate that is used by the PE 2 to forward the first service flow is in an open state. The PE 2 may not need to configure a common gate control list using a management plane, and the PE 2 may implement fast processing of a low-latency service based on enabling or disabling of the first low-latency forwarding mode, thereby implementing relatively flexible control and relatively simple management.

For example, that the PE 2 sends the first data packet to a CE 3 in the first low-latency forwarding mode includes that the PE 2 preferentially selects, in the first low-latency forwarding mode, the first data packet in the to-be-sent queue on the PE 2 for sending, i.e., preferentially sends the first data packet to the CE 3. Optionally, if the PE 2 uses a credit shaping algorithm, after the PE 2 preferentially selects the first data packet for sending, the method further includes reducing, by the PE 2, a value of credit. In an implementation, the to-be-forwarded queue on the PE 2 may further include a plurality of data packets that belong to the first service flow, and the PE 2 may continue to preferentially select the plurality of data packets that belong to the first service flow for sending, until all data packets that belong to the first service flow in the to-be-forwarded queue on the PE 2 are sent or the value of credit is reduced to 0.

If the first control information sent by the PE 1 in Embodiment 1 includes a first enabling identifier, and the first enabling identifier is used to identify enabling of the first low-latency forwarding mode, the method provided in Embodiment 2 of this application further includes the following.

Before step 401, the PE 1 may send, to the P 1 using the method provided in Embodiment 1, the first control information that includes the first enabling identifier. For the first control information that includes the first enabling identifier, refer to corresponding content in Embodiment 1. Details are not described herein again.

After step 404, the PE 1 may send a first disabling identifier to the P 1 using the method provided in Embodiment 1. The first disabling identifier is used to instruct a forwarding device that receives the first disabling identifier to stop processing the data packet of the first service flow in the first low-latency forwarding mode.

Step 409. The PE 1 stops sending a data packet of the first service flow in the first low-latency forwarding mode.

In this embodiment of this application, stopping sending of the data packet of the first service flow in the first low-latency forwarding mode by the PE 1 may be triggered in a plurality of manners. In a manner 1, the PE 1 may stop, based on the first disabling identifier, sending the data packet of the first service flow in the first low-latency forwarding mode. In a manner 2, after determining that a last data packet of the first service flow is sent, the PE 1 that servers as an ingress node may stop sending the data packet of the first service flow in the first low-latency forwarding mode. In a manner 3, the PE that serves as an ingress node may stop, under control of another control device or a management device, sending the data packet of the first service flow in the first low-latency forwarding mode. In a manner 4, after no data packet of the first service flow is received within predetermined duration, the PE 1 that serves as an ingress node may stop sending the data packet of the first service flow in the first low-latency forwarding mode.

Step 410. The P 1 stops, based on a first disabling identifier sent by the PE 1, sending the data packet of the first service flow in the first low-latency forwarding mode.

Step 411. The PE 2 stops, based on the first disabling identifier sent by the P 1, sending the data packet of the first service flow in the first low-latency forwarding mode.

Steps 409, 410, and 411 may be performed between any steps included in the method provided in Embodiment 2, and execution of steps 409, 410, and 411 depends on a sending moment of the disabling identifier. The following manner 1 or manner 2 may be used to stop sending the data packet of the first service flow in the first low-latency forwarding mode.

In the manner 1, the first low-latency forwarding mode is disabled, and a data packet that is of the first service flow and that is obtained after the first low-latency forwarding mode is disabled is sent to a queue with a low priority. The queue with a low priority and a queue with a high priority are relative concepts, and the queue with a low priority is a common queue relative to the priority queue in the first low-latency forwarding mode.

In the manner 2, the first low-latency forwarding mode is disabled, and a data packet that is of the first service flow and that is obtained after the first low-latency forwarding mode is disabled is discarded. The first low-latency forwarding mode may be disabled after the disabling identifier is obtained.

In the method provided in Embodiment 2 of this application, the PEI 1 may flexibly control a gate that is on the P 1 and the PE 2 and that is associated with the first service flow, to be specific, send the first control information used to control the first low-latency forwarding mode, and no gate control list needs to be configured for each port using the management plane, reducing management complexity.

When the operator network shown in FIG. 2 is an MPLS network, a method in which the PE 1 sends a data packet that belongs to the second service flow to the PE 2 along a second LSP is similar to the foregoing method in which the PE 1 sends, through the P 1, the data packet that belongs to the first service flow to the PE 2 along the first LSP, but the data packet that belongs to the second service flow does not need to be processed by the P 1. The second LSP is a path represented by a dashed line in FIG. 2 when the operator network is an MPLS network.

In Embodiment 2 of this application, the first low latency label is distinguished from a label corresponding to the first LSP. That is, a label used for forwarding that is allocated to each forwarding device in the first LSP and the first low latency label are different. In another possible implementation, a label used to guide forwarding that is allocated to each forwarding device in the first LSP, for example, an SR label, a segment label, the first label, or the second label, may be extended such that the label has function of instructing how to forward the first service flow (instructing how to forward the data packet that belongs to the first service flow) and a function of the first low latency label. For example, in this embodiment of this application, the first label and the second label may be extended such that the first label and the second label further have the function of the first low latency label. In this way, the PE 1 may not need to add the first low latency label to the first data packet, the P 1 may determine, based on the first label in the second data packet, to process the second data packet using the first low-latency forwarding mode, and the PE 2 may determine, based on the second label in the third data packet, to process the third data packet using the first low-latency forwarding mode, helping further reduce configuration complexity of a forwarding device in the MPLS network.

Embodiment 3

Figure 6:
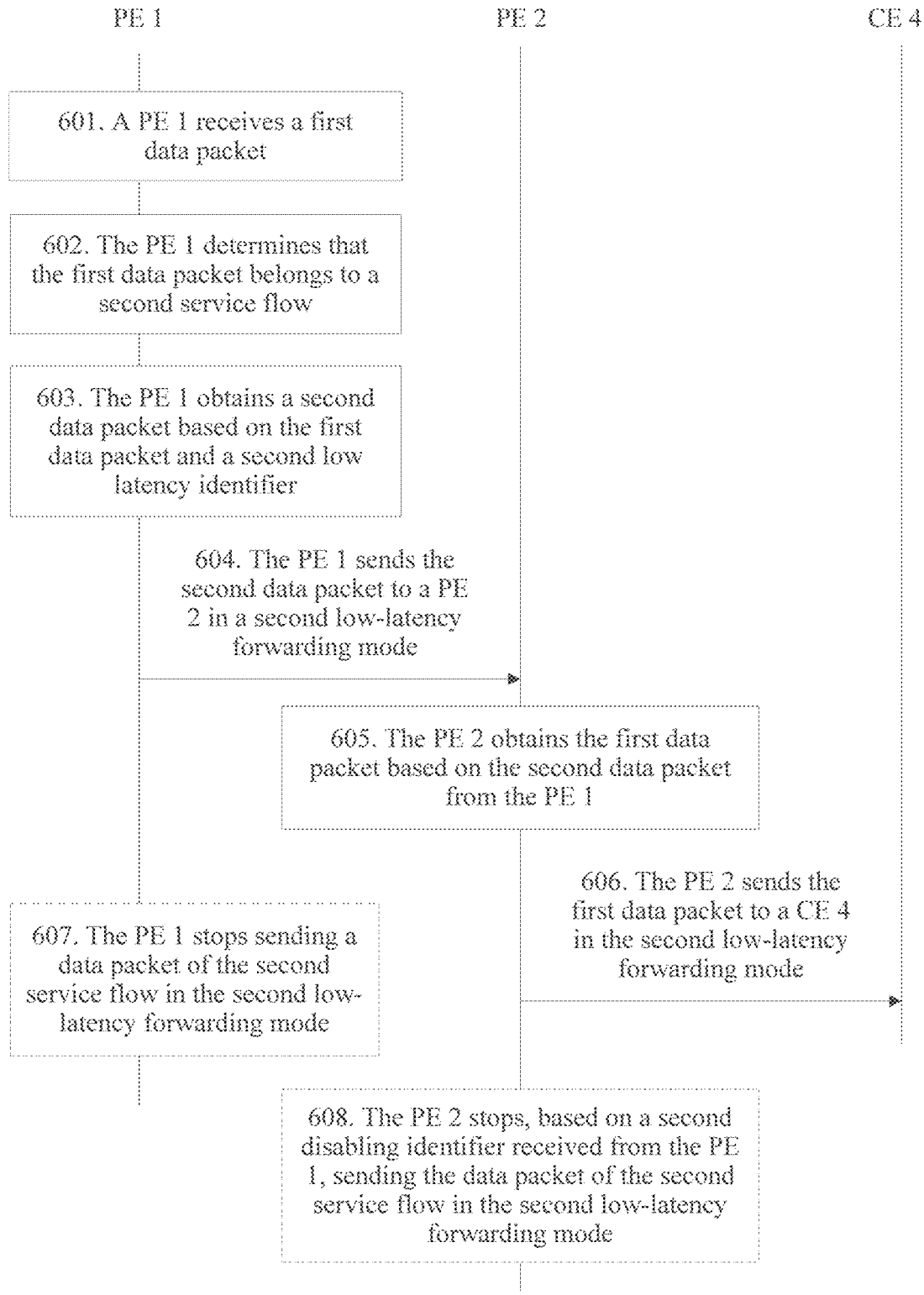
FIG. 6 is a flowchart of a method for processing a low-latency service flow according to Embodiment 3 of this application.

FIG. 6 is a flowchart of a method for processing a low-latency service flow according to Embodiment 3 of this application. In Embodiment 3 of this application, the method for processing a low-latency service flow is described using an example in which an operator network is an IP network, and a low-latency service flow is a second service flow. The PE 1 and the PE 2 in FIG. 2 run the IP. Before processing the second service flow, the PE 1 and the PE 2 complete configuration of a second low-latency forwarding mode. The following merely uses an example in which Embodiment 3 is executed after Embodiment 1 for description, and no further description is provided for an embodiment that is formed by interweaving Embodiment 1 with Embodiment 3. A second forwarding path between the PE 1 and the PE 2 may be planned in advance based on an IP routing protocol, for example, Intermediate System to Intermediate System (IS-IS) traffic engineering (TE) or Open Shortest Path First (OSPF)-TE. A planning process of the second forwarding path is not described in Embodiment 3 of this application. The following describes the method for processing a low-latency service flow according to Embodiment 3 of this application with reference to FIG. 2 and FIG. 6.

Step 601. The PE 1 receives a first data packet.

For example, the PE 1 receives the first data packet using a second port. The first data packet may be from a CE 2. The first data packet includes a third MAC address and a third IP address. The third MAC address is a MAC address of the CE 2. The third IP address is an IP address of the CE 2. The first data packet may further include a fourth MAC address and a fourth IP address. The fourth MAC address is a MAC address of a CE 4. The fourth IP address is an IP address of the CE 4. The CE 2 and the CE 4 may belong to a same VPN. The first data packet may be an IP packet or an Ethernet frame.

Optionally, between steps 601 and 602, the method provided in Embodiment 3 of this application further includes determining, by the PE 1, whether the first data packet belongs to the second service flow, and if the first data packet belongs to the second service flow, performing step 602 by the PE 1. If the first data packet does not belong to the second service flow, the PEI puts the first data packet in a to-be-forwarded queue, and processes, using a common scheduling method, a packet in the to-be-forwarded queue. The common scheduling method in this embodiment of this application is the same as the common scheduling method in Embodiment 2, and details are not described herein.

For example, the PE 1 may determine, using the method in step 401 of Embodiment 2, whether the first data packet belongs to the second service flow. Further, any one of a manner 1 to a manner 4 may be used.

In the manner 1, a tuple may include one or more of the second port, the third MAC address, the third IP address, the fourth MAC address, and the fourth IP address. The PE 1 may determine, based on the tuple, whether the first data packet belongs to the second service flow. A characteristic information table may be stored on the PE 1. The characteristic information table may include an identifier of the second service flow and characteristic information corresponding to a data packet that belongs to the second service flow. The characteristic information includes one or more of a MAC address, an IP address, an application layer port number, VLAN information, VXLAN information, and a physical layer port number. The PE 1 queries the characteristic information table using the tuple. If information that matches the tuple exists in the characteristic information table, the PE 1 determines that the first data packet belongs to the second service flow. A meaning of matching in Embodiment 3 of this application is the same as a meaning of matching in Embodiment 2, and details are not described herein.

In the manner 2, the characteristic information table stored on the PE 1 includes an identifier of a second service and characteristic information corresponding to a data packet that belongs to the second service. The characteristic information corresponding to the data packet that belongs to the second service may be the same as the characteristic information corresponding to the data packet that belongs to the second service flow in the manner 1. A method in which the PE 1 determines, based on the characteristic information corresponding to the data packet that belongs to the second service, whether the first data packet belongs to the second service flow is the same as the manner 1. A specific determining method is not described in detail herein.

In the manner 3, the first data packet further includes an identifier of a service flow to which the first data packet belongs. If the identifier of the service flow to which the first data packet belongs is the identifier of the second service flow, the PE 1 determines that the first data packet belongs to the second service flow.

In the manner 4, the first data packet further includes an identifier of a service to which the first data packet belongs. If the identifier of the service to which the first data packet belongs is the identifier of the second service, the PE 1 determines that the first data packet belongs to the second service. That is, the first data packet belongs to the second service flow.

Step 602. The PE 1 determines that the first data packet belongs to the second service flow.

For example, the PE 1 may obtain a second low latency identifier after determining that the first data packet belongs to the second service flow. A manner of obtaining the second low latency identifier by the PE 1 may be any one of a manner 1 to a manner 3.

In the manner 1, the PE 1 may obtain the identifier of the second service flow based on the characteristic information table in 601 after determining that the first data packet belongs to the second service flow. Alternatively, the first data packet carries the identifier of the second service flow, and the PE 1 may obtain the identifier of the second service flow from the first data packet. A correspondence between the second low latency identifier and the identifier of the second service flow is configured on the PE 1. The PE 1 may obtain the second low latency identifier based on the correspondence and the identifier of the second service flow.

In the manner 2, if the characteristic information table in step 601 includes the identifier of the second service, the PE 1 may obtain the identifier of the second service after determining that the first data packet belongs to the second service flow. Alternatively, the first data packet carries the identifier of the second service, and the PE 1 may obtain the identifier of the second service from the first data packet. A correspondence between the second low latency identifier and the identifier of the second service is configured on the PE 1. The PE 1 may obtain the second low latency identifier based on the correspondence and the identifier of the second service.

In the manner 3, if only the second low latency identifier is configured on the PE 1, and the PE 1 is used to forward only the second service flow, the PE 1 directly obtains the second low latency identifier after determining that the first data packet belongs to the second service flow.

Step 603. The PE 1 obtains a second data packet based on the first data packet and a second low latency identifier.

For example, the second data packet includes the first data packet and tunnel encapsulation. The tunnel encapsulation may be encapsulated into an outer layer of the first data packet. The tunnel encapsulation includes the second low latency identifier. The tunnel encapsulation may be Generic Routing Encapsulation (GRE).

After the PE 1 obtains the second data packet, the PE 1 sends the second data packet to a to-be-sent queue on the PE 1 based on the second low latency identifier. The to-be-sent queue on the PE 1 is a priority queue that corresponds to the second service flow and that is on the PE 1.

Step 604. The PE 1 sends the second data packet to the PE 2 in the second low-latency forwarding mode.

Before step 604, the PE 1 may configure the second low-latency forwarding mode using the method provided in Embodiment 1. In this way, it can be ensured that the PE 1 starts to run the second low-latency forwarding mode before sending the second data packet. A gate that is used by the PE 1 to forward the second service flow is in an open state. The PE 1 may not need to configure a common gate control list using a management plane, and may implement fast processing of a low-latency service based on enabling or disabling of the second low-latency forwarding mode, thereby implementing relatively flexible control and relatively simple management.

For example, that the PE 1 sends the second data packet to the PE 2 in the second low-latency forwarding mode includes the PE 1 identifies, in the second low-latency forwarding mode, a packet in the to-be-sent queue to obtain the second data packet, and the PE 1 preferentially selects, based on the second low latency identifier included in the second data packet, the second data packet for sending. The PE 1 may send the second data packet to the PE 2 along a tunnel between the PE 1 and the PE 2.

Step 605. The PE 2 obtains the first data packet based on the second data packet from the PE 1.

For example, that the PE 2 obtains the first data packet based on the second data packet from the PE 1 includes the PE 2 receives the second data packet sent by the PE 1, and the PE 2 removes the tunnel encapsulation from the second data packet to obtain the first data packet. After the PE 2 obtains the first data packet, the PE 2 sends the first data packet to a to-be-sent queue on the PE 2 based on the second low latency identifier included in the second data packet. The to-be-sent queue on the PE 2 is a priority queue that corresponds to the second service flow and that is on the PE 2.

Step 606. The PE 2 sends the first data packet to a CE 4 in the second low-latency forwarding mode.

Before step 606, the PE 2 may configure the second low-latency forwarding mode using the method provided in Embodiment 1. In this way, it can be ensured that the PE 2 starts to run the second low-latency forwarding mode before sending the first data packet. A gate that is used by the PE 2 to forward the second service flow is in an open state. The PE 2 may not need to configure a common gate control list using a management plane, and may implement fast processing of a low-latency service based on enabling or disabling of the second low-latency forwarding mode, thereby implementing relatively flexible control and relatively simple management.

For example, that the PE 2 sends the first data packet to a CE 4 in the second low-latency forwarding mode includes that the PE 2 preferentially selects, in the second low-latency forwarding mode, the first data packet in the to-be-sent queue on the PE 2 for sending, i.e., preferentially sends the first data packet to the CE 4.

If second control information sent by the PE 1 to the PE 2 in Embodiment 3 includes a second enabling identifier, and the second enabling identifier is used to identify enabling of the second low-latency forwarding mode, the method provided in Embodiment 3 of this application further includes the following.

Before step 601, the PE 1 may send, to a P 1 using the method provided in Embodiment 1, the second control information that includes the second enabling identifier. For the second control information that includes the second enabling identifier, refer to corresponding content in Embodiment 1. Details are not described herein again.

After step 604, the PE 1 may send a second disabling identifier to the PE 2 using the method provided in Embodiment 1. The second disabling identifier is used to instruct a forwarding device that receives the second disabling identifier to stop processing the data packet of the second service flow in the second low-latency forwarding mode.

Step 607. The PE 1 stops sending a data packet of the second service flow in the second low-latency forwarding mode.

In this embodiment of this application, stopping sending of the data packet of the second service flow in the first low-latency forwarding mode by the PE 1 may be triggered in a plurality of manners. In a manner 1, the PE 1 may stop, based on the second disabling identifier, sending the data packet of the second service flow in the second low-latency forwarding mode. In a manner 2, after determining that a last data packet of the second service flow is sent, the PE 1 that servers as an ingress node may stop sending the data packet of the second service flow in the second low-latency forwarding mode. In a manner 3, the PE 1 that serves as an ingress node may stop, under control of another control device or a management device, sending the data packet of the second service flow in the second low-latency forwarding mode. In a manner 4, after no data packet of the second service flow is received within predetermined duration, the PE 1 that serves as an ingress node may stop sending the data packet of the second service flow in the second low-latency forwarding mode.

Step 608. The PE 2 stops, based on a second disabling identifier received from the PE 1, sending the data packet of the second service flow in the second low-latency forwarding mode.

Steps 607 and 608 may be performed between any steps included in the method provided in Embodiment 3, and execution of steps 607 and 608 depends on a sending moment of the disabling identifier. A manner 1 or a manner 2 may be used to stop sending the data packet of the second service flow in the second low-latency forwarding mode. In the manner 1, the second low-latency forwarding mode is disabled, and a data packet that is of the second service flow and that is obtained after the second low-latency forwarding mode is disabled is sent to a queue with a low priority. The queue with a low priority and a queue with a high priority are relative concepts, and the queue with a low priority is a common queue relative to the priority queue in the second low-latency forwarding mode. In the manner 2, the second low-latency forwarding mode is disabled, and a data packet that is of the second service flow and that is obtained after the second low-latency forwarding mode is disabled is discarded. The second low-latency forwarding mode may be disabled after the disabling identifier is obtained.

In the method provided in Embodiment 3 of this application, the PE 1 may flexibly control a gate that is on the PE 2 and that is associated with the second service flow, to be specific, send the second control information used to control the second low-latency forwarding mode, and no gate control list needs to be configured for each port using the management plane, reducing management complexity.

When the operator network shown in FIG. 2 is an IP network, a method in which the PE 1 sends, through the P 1, a data packet that belongs to the first service flow to the PE 2 along a first forwarding path is similar to the foregoing method in which the PE 1 sends the data packet that belongs to the second service flow to the PE 2 along the second forwarding path, and details are not described herein. The first forwarding path is a path represented by a solid line in FI. 2 when the operator network is an IP network.

Embodiment 4

Figure 7:
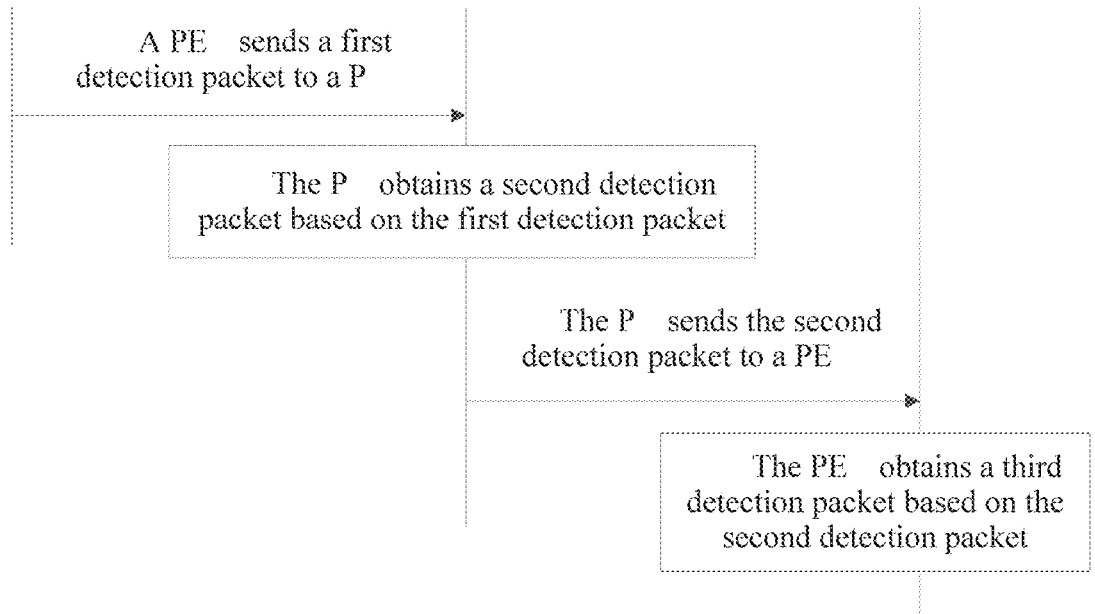
FIG. 7 is a flowchart of a method for detecting a transmission latency of a forwarding path according to Embodiment 4 of this application.

FIG. 7 is a flowchart of a method for detecting a transmission latency of a forwarding path according to Embodiment 4 of this application. In Embodiment 4 of this application, a method for detecting a low-latency service flow in a forwarding path is described using a first forwarding path as an example. The method provided in Embodiment 4 may be performed after a first low-latency forwarding mode is configured on a device in the first forwarding path and before the device in the first forwarding path processes a first service flow. The following describes the method for detecting a transmission latency of a forwarding path according to Embodiment 4 of this application with reference to FIG. 2 and FIG. 7.

Step 701. A PE 1 sends a first detection packet to a P 1.

For example, the first detection packet includes a first latency value and a second latency value. The first detection packet is used to obtain a transmission latency that is generated by a forwarding device in the first forwarding path. The first latency value is used to indicate maximum allowed latency duration of the forwarding device in the first forwarding path. The second latency value is latency duration generated by the PE 1. The latency duration generated by the PE 1 may be a latency value that is generated when the PE 1 forwards the first detection packet and that is obtained through actual measurement.

Optionally, the first detection packet further includes a moment at which the PE 1 sends the first detection packet. In this way, a forwarding device that serves as an egress of the first forwarding path, for example, a PE 2, may obtain the transmission latency of the first forwarding path based on the moment at which the PE 1 sends the first detection packet and a moment at which the PE 2 receives a second detection packet.

A method for sending the first detection packet by the PE 1 may be the same as a method for sending the second data packet by the PE 1 in Embodiment 2 or Embodiment 3, and details are not described herein.

Step 702. The P 1 obtains a second detection packet based on the first detection packet.

For example, that the P 1 obtains a second detection packet based on the first detection packet includes the P 1 obtains a third latency value, where the third latency value is duration from a time when the P 1 receives the first detection packet to a time when the P 1 sends the first detection packet, and the P 1 obtains the second detection packet based on the first detection packet and the third latency value, where the second detection packet includes the first detection packet and the third latency value. The moment at which the P 1 sends the first detection packet is a moment at which the P 1 sends the second detection packet, and the P 1 may obtain, through actual measurement, the moment at which the first detection packet is sent.

Step 703. The P 1 sends the second detection packet to a PE 2.

A method for sending the second detection packet by the P 1 may be the same as a method for sending the third data packet by the P 1 in Embodiment 2 or Embodiment 3, and details are not described herein.

Step 704. The PE 2 obtains a third detection packet based on the second detection packet.

For example, that the PE 2 obtains a third detection packet based on the second detection packet includes the PE 2 obtains a fourth latency value, where the fourth latency value is duration from a time when the PE 2 receives the second detection packet to a time when the PE 2 sends the second detection packet, and the PE 2 obtains the third detection packet based on the second detection packet and the fourth latency value, where the third detection packet includes the second detection packet and the fourth latency value. A moment at which the PE 2 sends the second detection packet is a moment at which the PE 2 sends the third detection packet, and the PE 2 may pre-estimate a moment for sending the second detection packet.

Optionally, after step 704, the method provided in Embodiment 4 of this application further includes reporting, by the PE 2, the third detection packet. For example, the PE 2 may send the third detection packet to a device that is configured to perform management, or the PE 2 sends, to the device that is configured to perform management, information and/or a parameter carried in the third detection packet such that the device that is configured to perform management obtains a transmission latency of the first forwarding path. The device that is configured to perform management may be a network management platform.

In the method provided in Embodiment 4 of this application, the PE 1 sends the first detection packet along the first forwarding path. This helps a device in the first forwarding path process the first detection packet, to obtain a latency value generated by each device and locate a node that cannot meet the first latency value, and helps achieve an optimal low-latency service forwarding effect.

Embodiment 5

Figure 8:
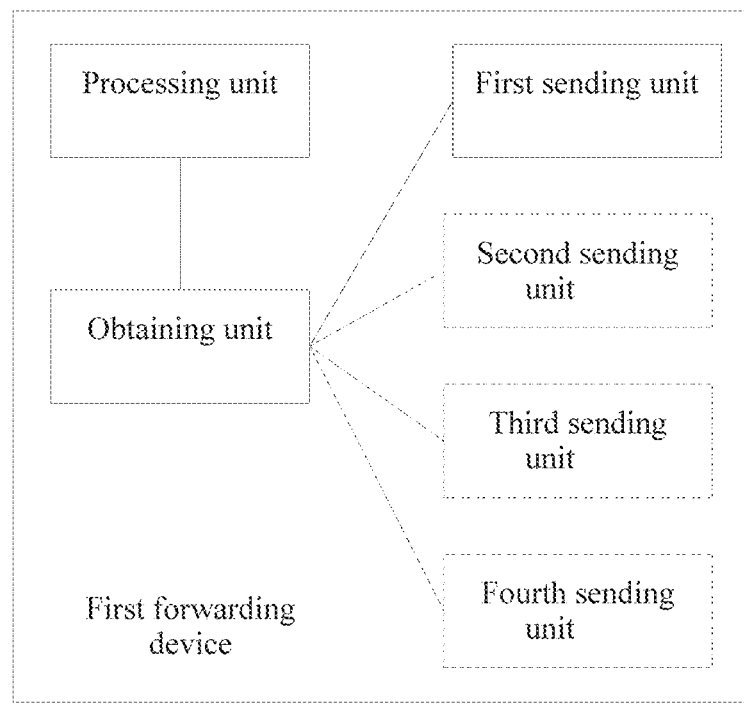
FIG. 8 is a schematic diagram of a first forwarding device according to Embodiments of this application.

FIG. 8 is a schematic diagram of a first forwarding device according to Embodiment 5 of this application. The first forwarding device provided in Embodiment 5 of this application may be the PE 1 in FIG. 3, FIG. 4, or FIG. 6. The first forwarding device provided in Embodiment 5 of this application may use a method used by the PE 1. For content that is the same as that in any one of Embodiments 1 to 4, details are not described herein again. The following describes, with reference to FIG. 8, the first forwarding device provided in Embodiment 5 of this application.

The first forwarding device provided in Embodiment 5 of this application includes a processing unit 801, an obtaining unit 802, and a first sending unit 803.

The processing unit 801 is configured to obtain a low latency identifier corresponding to the first service flow after determining that a received first data packet belongs to a first service flow.

The obtaining unit 802 is configured to obtain a second data packet based on the first data packet and the low latency identifier after the processing unit 801 determines that the first data packet belongs to the first service flow. The second data packet includes the first data packet and the low latency identifier. A low-latency forwarding mode is a mode in which fast forwarding of the first service flow is implemented under dynamic control. The low latency identifier is used to instruct a forwarding device that receives the first service flow to forward the first service flow in the low-latency forwarding mode. The second data packet belongs to the first service flow.

The first sending unit 803 is configured to send the second data packet to a second forwarding device in the low-latency forwarding mode. If the first forwarding device sends the second data packet along a first forwarding path, the second forwarding device in this embodiment may be the P 1 in FIG. 3 or FIG. 4, and the P 1 is a next hop of the PE 1 in the first forwarding path. If the first forwarding device sends the second data packet along a second forwarding path, the second forwarding device in this embodiment may alternatively be the PE 2 in FIG. 3 or FIG. 6, and the PE 2 is a next hop of the PE 1 in the second forwarding path.

Optionally, the obtaining unit 802 is further configured to obtain control information. The first forwarding device further includes a second sending unit 804. The second sending unit 804 is configured to send the control information to the second forwarding device, where the control information is used to control a status of the low-latency forwarding mode.

For example, for content of the control information, refer to corresponding content in Embodiment 1.

Optionally, the control information includes an enabling identifier, and the enabling identifier is used to identify enabling of the low-latency forwarding mode. The first forwarding device further includes a third sending unit 805. The third sending unit 805 is configured to send a disabling identifier to the second forwarding device, where the disabling identifier is used to identify disabling of the low-latency forwarding mode.

Optionally, the obtaining unit 802 is further configured to obtain a detection packet. The first forwarding device further includes a fourth sending unit 806. The fourth sending unit 806 is configured to send the detection packet to the second forwarding device. The detection packet includes a first latency value and a second latency value. The detection packet is used to obtain a transmission latency of a forwarding device in a forwarding path. The first latency value is maximum allowed latency duration of the forwarding device in the forwarding path, and the second latency value is latency duration generated by the first forwarding device. For example, if the first forwarding device is an ingress node of a plurality of forwarding paths, for example, an ingress node of the first forwarding path and the second forwarding path, the first forwarding device may send one detection packet along the first forwarding path and send another detection packet along the second forwarding path.

The first forwarding device provided in this embodiment of this application may flexibly control a gate that is on the second forwarding device and that is associated with the first service flow, to be specific, send first control information used to control the low-latency forwarding mode, and no gate control list needs to be configured for each port using a management plane, reducing management complexity.

Embodiment 6

Figure 9:
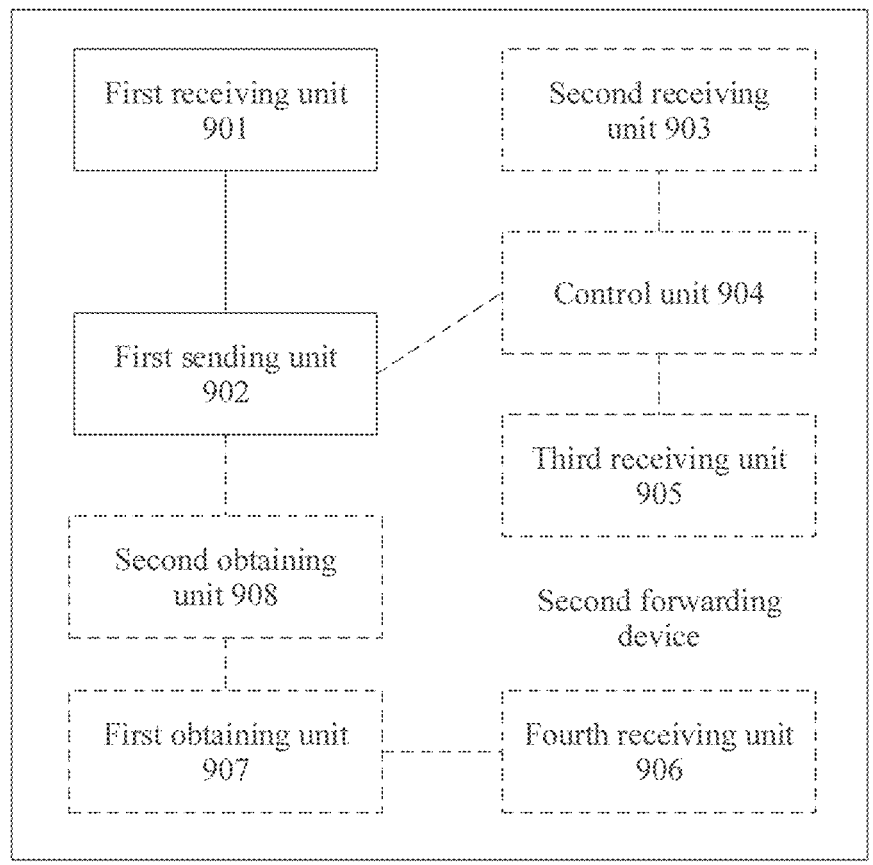
FIG. 9 is a schematic diagram of a second forwarding device according to Embodiment 6 of this application.

FIG. 9 is a schematic diagram of a second forwarding device according to Embodiment 6 of this application. The second forwarding device provided in Embodiment 6 of this application may be the P 1 in FIG. 3 or FIG. 4, and the P 1 is a next hop of a PE 1 in a first forwarding path. The second forwarding device may alternatively be the PE 2 in FIG. 3 or FIG. 4, and the PE 2 is a next hop of a PE 1 in a second forwarding path. The second forwarding device provided in Embodiment 6 of this application may use a method used by the P 1 or the PE 2. For content that is the same as that in any one of Embodiments 1 to 4, details are not described herein again. The following describes, with reference to FIG. 9, the second forwarding device provided in Embodiment 6 of this application.

The second forwarding device includes a first receiving unit 901 and a first sending unit 902.

The first receiving unit 901 is configured to receive a second data packet from a first forwarding device. The second data packet includes a first data packet and a low latency identifier. A low-latency forwarding mode is a mode in which fast forwarding of a first service flow is implemented under dynamic control. The low latency identifier is used to instruct a forwarding device that receives the first service flow to forward the first service flow in the low-latency forwarding mode. The second data packet belongs to the first service flow.

The first sending unit 902 is configured to send the second data packet in the low-latency forwarding mode based on the low latency identifier. If the second forwarding device is an intermediate forwarding device, for example, the P 1, the first sending unit 902 may send the second data packet to a next hop in the low-latency forwarding mode. If the second forwarding device is a node that serves as a network egress, for example, the PE 2, the first sending unit 902 may send, in the low-latency forwarding mode, the first data packet included in the second data packet to a CE that communicates with the second forwarding device.

Optionally, the second forwarding device further includes a second receiving unit 903 and a control unit 904. The second receiving unit 903 is configured to receive control information from the first forwarding device. The control information is used to control a status of the low-latency forwarding mode. The control unit 904 is configured to control the status of the low-latency forwarding mode based on the control information.

For example, the control information includes a start moment and an end moment of the low-latency forwarding mode. The control unit 904 is further configured to run the low-latency forwarding mode based on the start moment and the end moment of the low-latency forwarding mode.

For example, the control information includes a start moment and a runtime of the low-latency forwarding mode. The control unit 904 is further configured to run the low-latency forwarding mode based on the start moment and the runtime of the low-latency forwarding mode.

Optionally, the control information includes an enabling identifier. The enabling identifier is used to identify enabling of the low-latency forwarding mode. The second forwarding device further includes a third receiving unit 905. The third receiving unit 905 is configured to receive a disabling identifier sent by the first forwarding device. The disabling identifier is used to identify disabling of the low-latency forwarding mode. The control unit 904 is further configured to stop, based on the disabling identifier, the first sending unit 902 from sending a data packet of the first service flow in the low-latency forwarding mode.

Optionally, the second forwarding device further includes a fourth receiving unit 906, a first obtaining unit 907, and a second obtaining unit 908. The fourth receiving unit 906 is configured to receive a first detection packet from the first forwarding device. The first detection packet includes a first latency value and a second latency value. The first detection packet is used to obtain a transmission latency that is generated by a forwarding device in a forwarding path. The first latency value is maximum allowed latency duration of the forwarding device in the forwarding path, and the second latency value is latency duration generated by the first forwarding device. The first obtaining unit 907 is configured to obtain a third latency value, where the third latency value is duration from a time when the second forwarding device receives the first detection packet to a time when the second forwarding device sends the first detection packet. The second obtaining unit 908 is configured to obtain a second detection packet based on the first detection packet and the third latency value, where the second detection packet includes the first detection packet and the third latency value.

Optionally, the second forwarding device is an intermediate forwarding device, and the first sending unit 902 is further configured to send the second detection packet to a third forwarding device. The third forwarding device is a next hop of the second forwarding device along a first direction in the forwarding path, and the first direction is a direction from the first forwarding device to a device that serves as an egress in the forwarding path.

The second forwarding device in Embodiment 6 of this application may send, based on the configured low-latency forwarding mode, the second data packet in the low-latency forwarding mode after receiving the first data packet, and does not need to store a gate control list delivered by a management plane, thereby implementing relatively flexible control and helping reduce management complexity.

Embodiment 7

Figure 10:
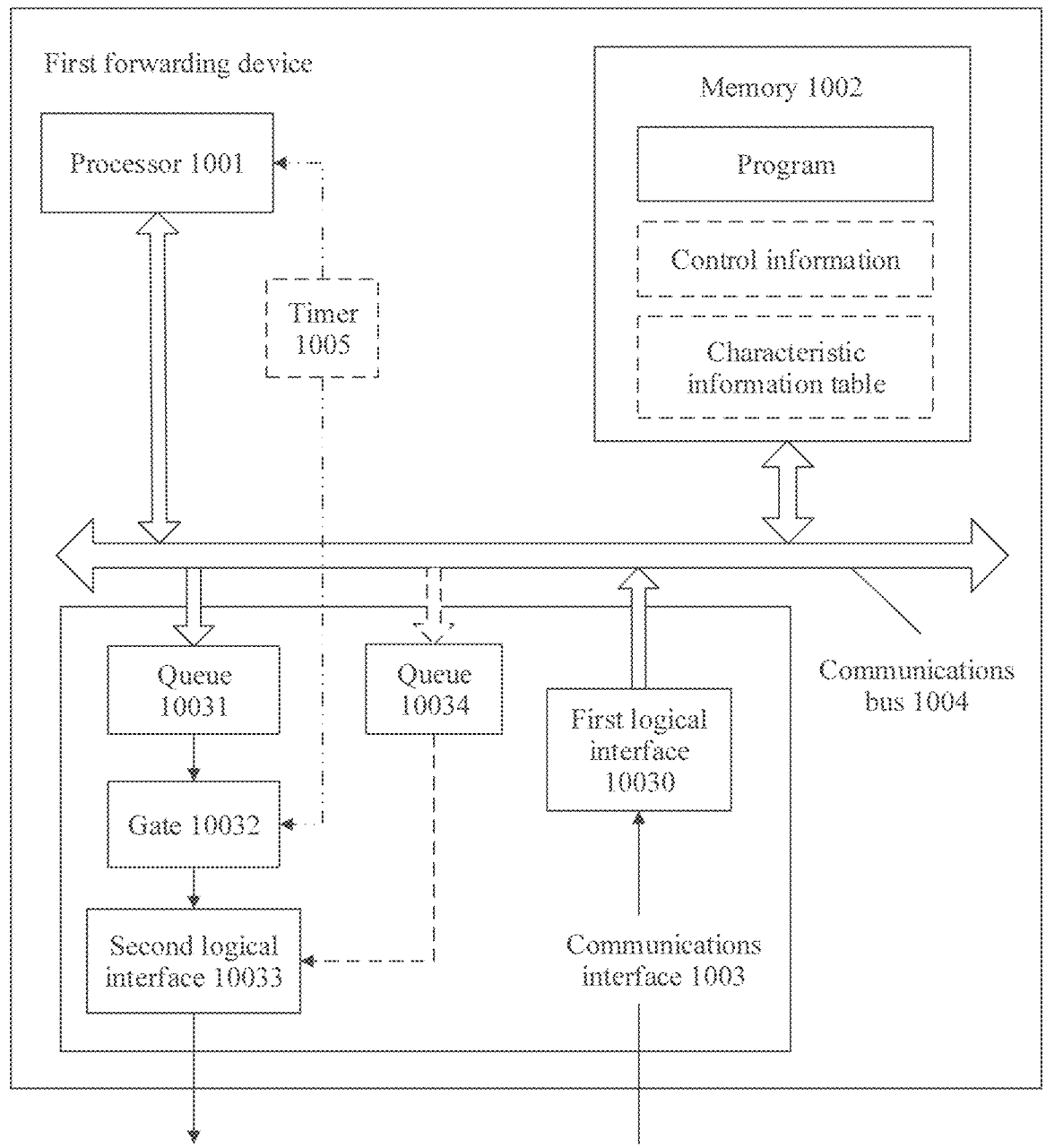
FIG. 10 is a schematic diagram of a first forwarding device according to Embodiment 7 of this application.

FIG. 10 is a schematic diagram of a first forwarding device according to Embodiment 7 of this application. The first forwarding device shown in FIG. 10 and the first forwarding device shown in FIG. 8 may be a same device. The first forwarding device shown in FIG. 10 may be the PE 1 in any one of Embodiment 1 to Embodiment 4. The first forwarding device provided in Embodiment 7 of this application includes a processor 1001, a memory 1002, and a communications interface 1003. The processor 1001, the memory 1002, and the communications interface 1003 are connected using a communications bus 1004. The memory 1002 is configured to store a program. Optionally, the memory 1002 may be further configured to store control information and/or the characteristic information table in Embodiment 2.

The processor 1001 performs, based on an executable instruction included in the program read from the memory 1002, the following operations receiving a first data packet using the communications interface 1003, determining that the first data packet belongs to a first service flow, obtaining a second data packet based on the first data packet and a low latency identifier, where the second data packet includes the first data packet and the low latency identifier, the low latency identifier is used to instruct a forwarding device that receives the first service flow to forward the first service flow in a low-latency forwarding mode, and the second data packet belongs to the first service flow, and sending the second data packet to a second forwarding device in the low-latency forwarding mode using the communications interface 1003.

Optionally, the processor 1001 may further send the control information to the second forwarding device using the communications interface 1003 based on the executable instruction. The control information is used to control a status of the low-latency forwarding mode.

For example, the control information is carried in an RSVP message or a G-ACH channel message. For specific descriptions of the RSVP message and the G-ACH channel message, refer to corresponding content in Embodiment 1. Details are not described herein again.

For example, for content of the control information, refer to corresponding content in Embodiment 1. Details are not described herein again.

Optionally, the processor 1001 may further, based on the executable instruction, send a detection packet to the second forwarding device using the communications interface 1003 before sending the second data packet to the second forwarding device. The detection packet includes a first latency value and a second latency value. Content of the first latency value and the second latency value is the same as that in the foregoing embodiments, and details are not described herein again.

In a manner, the communications interface 1003 includes at least two logical interfaces, at least one queue, and at least one gate. In FIG. 10, an example in which the communications interface 1003 includes a first logical interface 10030, a queue 10031, a gate 10032, and a second logical interface 10033 is merely used for description. The queue 10031, the gate 10032, and the second logical interface 10033 are configured to process a data packet of the first service flow. The processor 1001 may receive the first data packet using the first logical interface 10030. The first logical interface 10030 in this embodiment may be the first port or the second port in Embodiment 2. The processor 1001 may output the obtained second data packet to the queue 10031. The processor 1001 controls, based on the control information, the gate 10032 to open, to be specific, to switch to the low-latency forwarding mode. The processor 1001 controls the data packet of the first service flow in the queue 10031, for example, the second data packet, to be preferentially output to the gate 10032. If the gate 10032 is in an open state, the second data packet is sent to the second logical interface 10033, and is output to a corresponding physical line using the second logical interface 10033.

Optionally, the communications interface 1003 further includes a queue 10034 that can communicate with the second logical interface 10033. The queue 10034 is a queue including a to-be-forwarded data packet that is processed in a common forwarding mode. After stopping using the low-latency forwarding mode, the second forwarding device may send the data packet using the queue 10034 and the second logical interface 10033 in a common queue forwarding manner. A priority of the queue 10034 is lower than a priority of the queue 10031.

The second logical interface 10033 and the first logical interface 10030 may physically be a same physical interface, and the physical interface can implement a transceiver function. The second logical interface 10033 and the first logical interface 10030 may alternatively be physically implemented using different physical interfaces, and specific implementations of the second logical interface 10033 and the first logical interface 10030 are not limited in this embodiment of this application.

In a manner, the processor 1001 may control the opening of the gate 10032 based on an internal timer and the control information. In another manner, the first forwarding device further includes a timer 1005. The timer 1005 may be configured to synchronize timers of the processor 1001 and the gate 10032. The processor 1001 may control the opening of the gate 10032 based on the timer 1005 and the control information.

Embodiment 8

Figure 11:
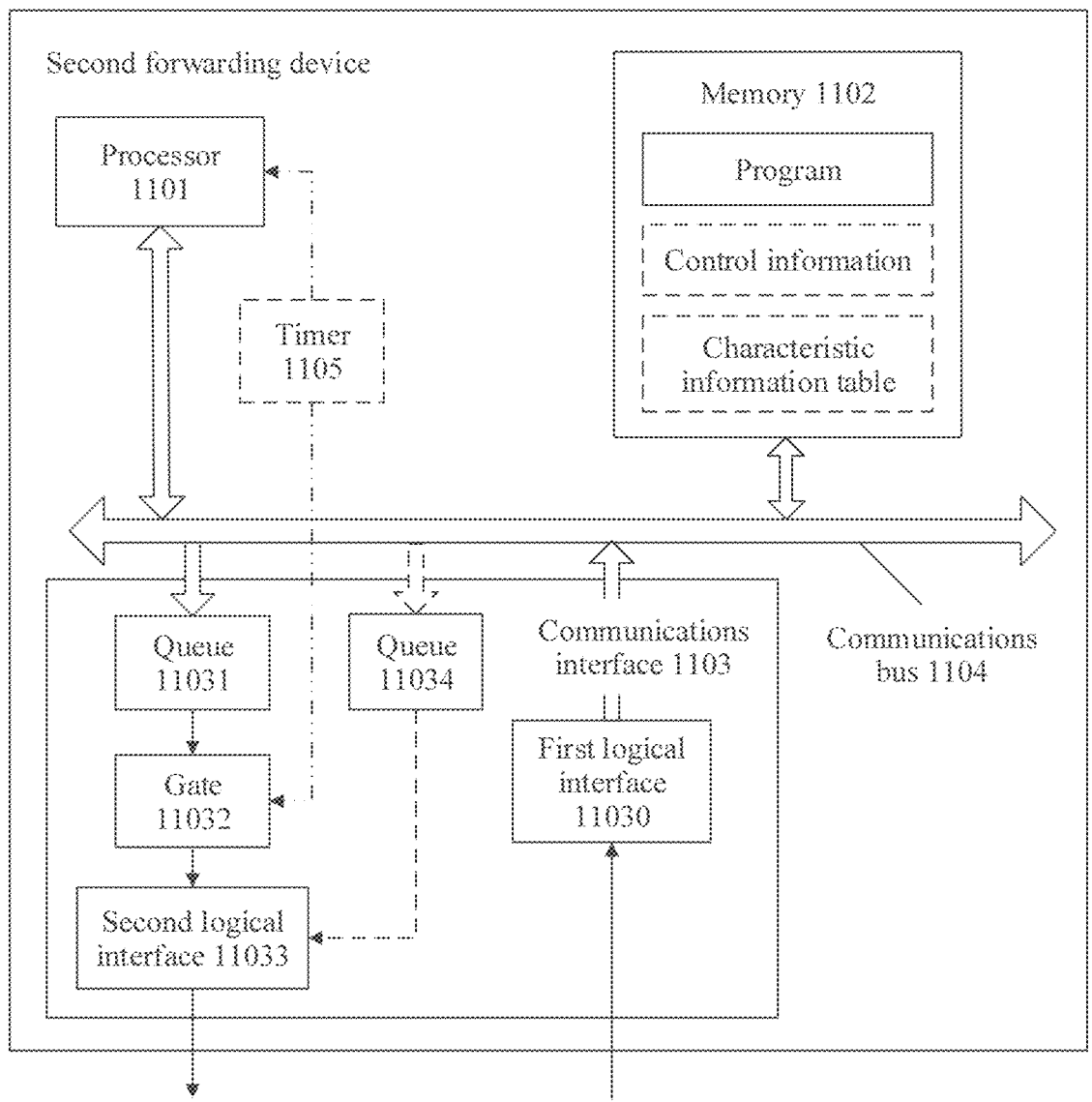
FIG. 11 is a schematic diagram of a second forwarding device according to Embodiment 8 of this application.

FIG. 11 is a schematic diagram of a second forwarding device according to Embodiment 8 of this application. The second forwarding device shown in FIG. 11 and the second forwarding device shown in FIG. 9 may be a same device. The second forwarding device shown in FIG. 11 may be the P 1 or the PE 2 in any one of Embodiment 1 to Embodiment 4. The second forwarding device provided in Embodiment 8 of this application includes a processor 1101, a memory 1102, and a communications interface 1103. The processor 1101, the memory 1102, and the communications interface 1103 are connected using a communications bus 1104. The memory 1102 is configured to store a program. Optionally, the memory 1102 may be further configured to store control information.

The processor 1101 performs, based on an executable instruction included in the program read from the memory 1102, the following operations receiving a second data packet from a first forwarding device using the communications interface 1103, where the second data packet includes a first data packet and a low latency identifier, the low latency identifier is used to instruct a forwarding device that receives a first service flow to forward the first service flow in a low-latency forwarding mode, and the second data packet belongs to the first service flow, and sending the second data packet in the low-latency forwarding mode using the communications interface 1103 based on the low latency identifier.

Optionally, the processor 1101 may further receive the control information from the first forwarding device using the communications interface 1103 based on the executable instruction. The control information is used to control a status of the low-latency forwarding mode. The processor 1101 further controls the status of the low-latency forwarding mode based on the control information.

For example, the control information may be carried in an RSVP message or a G-ACH channel message. For details, refer to corresponding content in Embodiment 1.

Optionally, for content of the control information, refer to corresponding content in Embodiment 1. Details are not described herein again. For a method for dynamically controlling, by the processor 1101, the low-latency forwarding mode based on the control information, refer to corresponding content in Embodiment 1 or Embodiment 2, and details are not described herein.

Optionally, the processor 1101 may further receive a first detection packet from the first forwarding device using the communications interface 1103 based on the executable instruction. The first detection packet includes a first latency value and a second latency value. The processor 1101 further obtains a third latency value. A first latency value, a second latency value, and the third latency value are the same as those in the foregoing embodiments, and details are not described herein again. The processor 1101 further obtains a second detection packet based on the first detection packet and the third latency value. The second detection packet includes the first detection packet and the third latency value.

Optionally, if the second forwarding device is an intermediate forwarding device, for example, the P 1 in Embodiment 1, Embodiment 2, or Embodiment 4, the processor 1101 may further send the second detection packet to a third forwarding device using the communications interface 1103 based on the executable instruction. The third forwarding device is a next hop of the second forwarding device in a forwarding path.

In a manner, the communications interface 1103 includes at least two logical interfaces, at least one queue, and at least one gate. In FIG. 11, an example in which the communications interface 1103 includes a first logical interface 11030, a queue 11031, a gate 11032, and a second logical interface 11033 is merely used for description. The queue 11031, the gate 11032, and the second logical interface 11033 are configured to process a data packet of the first service flow. The processor 1101 may receive the second data packet using the first logical interface 11030. The processor 1101 may output the second data packet to the queue 11031. The processor 1101 controls, based on the control information, the gate 11032 to open, to be specific, to switch to the low-latency forwarding mode. The processor 1101 controls the data packet of the first service flow in the queue 11031, for example, the second data packet, to be preferentially output to the gate 11032. If the gate 11032 is in an open state, the second data packet is sent to the second logical interface 11033, and is output to a corresponding physical line using the second logical interface 11033.

Optionally, the communications interface 1103 further includes a queue 11034 that can communicate with the second logical interface 11033. The queue 11034 is a queue including a to-be-forwarded data packet that is processed in a common forwarding mode. After stopping using the low-latency forwarding mode, the second forwarding device may send the data packet using the queue 11034 and the second logical interface 11033 in a common queue forwarding manner. A priority of the queue 11034 is lower than a priority of the queue 11031.

The second logical interface 11033 and the first logical interface 11030 may physically be a same physical interface, and the physical interface can implement a transceiver function. The second logical interface 11033 and the first logical interface 11030 may alternatively be physically implemented using different physical interfaces, and specific implementations of the second logical interface 11033 and the first logical interface 11030 are not limited in this embodiment of this application.

In a manner, the processor 1101 may control, based on an internal timer and the control information, the opening of the gate 11032. In another manner, the first forwarding device further includes a timer 1105. The processor 1101 may control the opening of the gate 11032 based on the timer 1105 and the control information. The timer 1105 may be configured to synchronize timers of the processor 1101 and the gate 11032.

Embodiment 9

Embodiment 9 of this application further provides a system for processing a low-latency service flow. The system provided in Embodiment 9 of this application may include the first forwarding device provided in Embodiment 5 and the second forwarding device provided in Embodiment 6. Alternatively, the system provided in this embodiment of this application may include the first forwarding device provided in Embodiment 7 and the second forwarding device provided in Embodiment 8. A function and a structure of each forwarding device are not repeatedly described herein. For details, refer to descriptions in corresponding embodiments.

Embodiment 10

Figure 12:
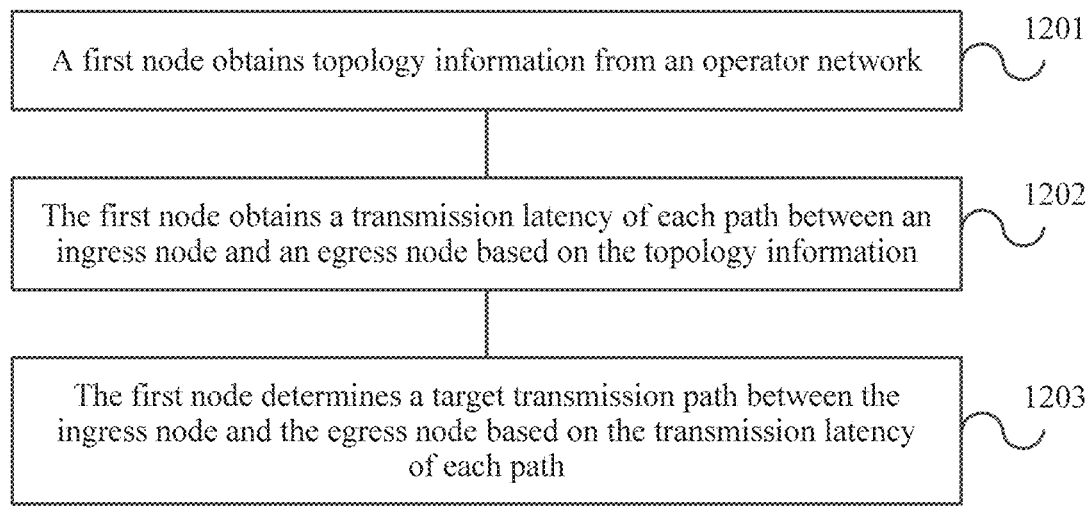
FIG. 12 is a flowchart of a method for establishing a forwarding path according to Embodiment 10 of this application.

FIG. 12 is a flowchart of a method for establishing a forwarding path according to Embodiment 10 of this application. The method provided in Embodiment 10 may be used to establish the first forwarding path or the second forwarding path in the network scenario shown in FIG. 2. The method provided in Embodiment 10 may be performed by any node in the operator network shown in FIG. 2. A first node in the method provided in Embodiment 10 is any node in the operator network shown in FIG. 2. For example, the first node may be the PE 1, the P 1, or the PE 2 in FIG. 2. According to the method provided in Embodiment 10 of this application, the first forwarding path and the second forwarding path that are shown in FIG. 2 may be determined based on a network scenario shown in FIG. 13. The following describes, with reference to network scenarios shown in FIG. 13 and FIG. 2, the method provided in Embodiment 10 of this application.

Step 1201. The first node obtains topology information from the operator network.

The topology information is topology information of nodes in each path between an ingress node and an egress node. The topology information includes a physical link latency between two adjacent nodes and node residence duration of each node. The ingress node in this embodiment of this application is a node that serves as a network ingress. The egress node in this embodiment of this application is a node that serves as a network egress.

Step 1202. The first node obtains a transmission latency of each path between an ingress node and an egress node based on the topology information.

Step 1203. The first node determines a target transmission path between the ingress node and the egress node based on the transmission latency of each path.

Figure 13:
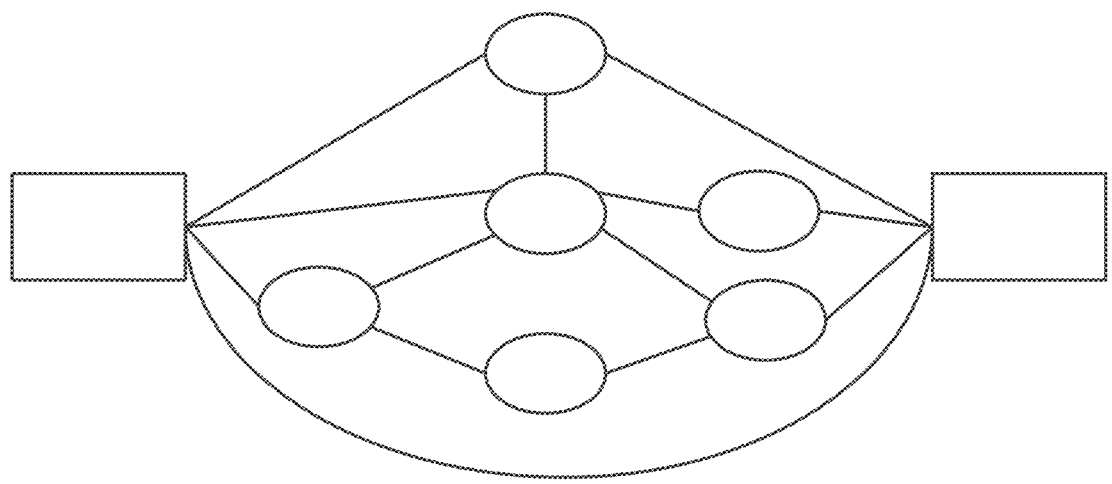
FIG. 13 is a schematic diagram of a network scenario for establishing a forwarding path according to an embodiment of this application.

As shown in FIG. 2 and FIG. 13, the ingress node is the PE 1, and the egress node is the PE 2. The target transmission path between the PE 1 and the PE 2 may be the first forwarding path and/or the second forwarding path mentioned in the foregoing embodiments. A transmission latency of the first forwarding path is a sum of a physical link latency between two adjacent nodes in the first forwarding path and node residence duration of each node in the first forwarding path. As shown in FIG. 2, the transmission latency of the first forwarding path is a sum of a physical link latency between the PE 1 and the P 1, a physical link latency between the P 1 and the PE 2, node residence duration of the PE 1, node residence duration of the P 1, and node residence duration of the PE 2. A transmission latency of the second forwarding path is a sum of a physical link latency between two adjacent nodes in the second forwarding path and node residence duration of each node in the second forwarding path. As shown in FIG. 2, the transmission latency of the second forwarding path is a sum of a physical link latency between the PE 1 and the PE 2, the node residence duration of the PE 1, and the node residence duration of the PE 2.

In step 1201, any node in the operator network is used as an example, and the node may measure a physical link latency between the node and a neighboring node, and may further measure node residence duration of the node. After obtaining the physical link latency and the node residence duration of the node through measurement, the node may send the physical link latency and the node residence duration of the node that are obtained by the node to another node in the operator network in a form of topology information. The node residence duration described in this embodiment of this application is a latency value generated by the node, or is latency duration generated for the node.

In step 1201, as shown in FIG. 2, the first node may receive topology information sent by the P 1. The topology information sent by the P 1 includes the physical link latency between the P 1 and the PE 1, the physical link latency between the P 1 and the PE 2, and the node residence duration of the P 1. The first node may further receive topology information sent by the PE 2. The topology information sent by the PE 2 includes the physical link latency between the P 1 and the PE 2, the physical link latency between the PE 2 and the PE 1, and the node residence duration of the PE 2. The first node may receive topology information sent by the PE 1. The topology information sent by the PE 1 includes the physical link latency between the P 1 and the PE 1, the physical link latency between the PE 1 and the PE 2, and the node residence duration of the PE 1. The first node may be a node in the operator network shown in FIG. 2 except the PE 1, the P 1, and the PE 2, or may be any one of the PE 1, the P 1, and the PE 2. The first node may determine the target transmission path between the ingress node and the egress node based on the obtained topology information. The target transmission path is a path that meets a latency requirement and is used to transmit a low-latency service flow, for example, the first forwarding path or the second forwarding path shown in FIG. 2.

In step 1201, an example in which the first node obtains first topology information is used for description. The first node may measure the first physical link latency by receiving a latency measurement packet from a first neighboring node. For example, the first node receives the latency measurement packet sent by the first neighboring node. The latency measurement packet includes a sending time stamp of sending the latency measurement packet by the first neighboring node. The first node may obtain the first physical link latency based on a receiving time stamp for receiving the latency measurement packet and the sending time stamp. The latency measurement packet is directly sent to the first node by the first neighboring node and not forwarded by another node. As shown in FIG. 13, if the first node is a node 4 in FIG. 13, and the first neighboring node is a node 6 in FIG. 13, the node 6 sends a latency measurement packet to the node 4, where the latency measurement packet includes a sending time stamp t1 of sending the latency measurement packet by the node 6. After receiving the latency measurement packet, the node 4 obtains a receiving time stamp t2. The node 4 may obtain a physical link latency between the node 6 and the node 4 based on the receiving time stamp t2 and the sending time stamp t1 included in the latency measurement packet. A method for obtaining a physical link latency between any two adjacent nodes by the two adjacent nodes in FIG. 13 is the same as the method for obtaining the physical link latency between the node 6 and the node 4, and is not enumerated herein for description. A node 1 in FIG. 13 may be the P 1 in FIG. 2.

Optionally, for a physical link latency between any two adjacent nodes, a value of the physical link latency between any two adjacent nodes does not vary with a direction. If a value of a physical link latency between any two adjacent nodes may vary with a direction, physical link latencies between the two adjacent nodes in different directions may be separately detected, and an average value of detection results for the two directions may be used as the physical link latency between the two adjacent nodes.

In step 1201, for a measurement of a physical link latency between any two adjacent nodes, a plurality of measurements may be performed by sending a plurality of latency measurement packets. Statistics about results of the plurality of measurements are collected, for example, by obtaining an average value, calculating an expected value, obtaining a maximum value, or obtaining a minimum value to obtain the physical link latency between the two adjacent nodes.

In this embodiment of this application, node residence duration of a packet in a node is closely related to actual load of the node. For a no-load node, a packet resides on the node for very short duration. For a node that is almost fully loaded, a packet resides on the node for relatively long duration. Therefore, to more precisely reflect node residence duration of a packet, in step 1201, the node residence duration may be obtained by querying a mapping table between node load and residence duration. In addition, the node residence duration may further be determined by a network topology structure, a link medium, a link length, and a device of the node. Further, in each node, a mapping table between node load and residence duration of the node may be created in advance. For example, for any node, a mapping table between load and residence duration of the node may be shown in Table 1.

TABLE 1

| Node load (percentage) | Node residence duration |
|---|---|
| 0% | 0 ms |
| 10% | 0.01 ms |
| 20% | 0.05 ms |
| . . . | . . . |
| 50% | 0.5 ms |

When the load of the node is 20%, the node residence duration of the node is 0.05 ms. Any node may obtain a load status of the node, and query the mapping table for node residence duration based on the load status of the node. The load of any node may be load at any moment, or an average value of load in a time period, or load at a specific moment.

In this embodiment of this application, any node uses the OSPF or IS-IS protocol to transmit topology information obtained by the node. The topology information obtained by the node may be topology information obtained by the node through detection, or may be topology information obtained from another node. For example, routing capability expansion may be performed on the OSPF or IS-IS protocol such that a message of the OSPF or IS-IS protocol carries the topology information obtained by the node. A possible structure is not described in detail herein.

In step 1203, the first node may determine, based on the transmission latency of each path between the ingress node and the egress node, the transmission path that meets the latency requirement as the target transmission path. Optionally, the target transmission path may be one path, or may be a plurality of paths that meet the latency requirement. The latency requirement may be that a transmission latency required by the low-latency service flow is less than or equal to a preset value. As shown in FIG. 13, the PE 1 is the ingress node, the PE 2 is the egress node, and a plurality of transmission paths exist between the PE 1 and the PE 2. The first node may calculate a transmission latency of each transmission path in FIG. 13. The first forwarding path (which is represented by a solid line) in FIG. 2 is a transmission path that has a relatively short latency in the plurality of transmission paths in FIG. 13 and that meets a latency requirement of the first service flow. The second forwarding path (which is represented by a dashed line) in FIG. 2 is a transmission path that has a relatively short latency in the plurality of transmission paths in FIG. 13 and that meets a latency requirement of the second service flow. The first node may determine the first forwarding path (which is represented by the solid line) and the second forwarding path (which is represented by the dashed line) in FIG. 2 as the target transmission paths.

The node in Embodiment 10 of this application may be a device in the operator network shown in FIG. 2.

The foregoing general purpose processor may be a microprocessor or the processor may be any conventional processor, or the like. The steps of the methods disclosed with reference to the embodiments of this application may be directly performed using a combination of hardware in the processor and a software module. When it is implemented using software, code that implements the foregoing functions may be stored in a computer-readable medium, where the computer-readable medium includes a computer storage medium. The storage medium may be any available medium accessible to a computer. The following is used as an example but is not limited The computer readable medium may be a random access memory (RAM), a read-only memory (ROM), an electrically erasable programmable ROM (EEPROM) a compact disc ROM (CD-ROM) or other optical disk storage, a disk storage medium or other disk storage devices, or any other medium that can be used to carry or store expected program code in a command or data structure form and can be accessed by a computer. The computer-readable medium may be a compact disc (CD), a laser disc, a digital video disc (DVD), a FLOPPY DISK, or a BLU-RAY DISC.

Finally, it should be noted that the foregoing embodiments are merely intended to describe examples of the technical solutions of this application other than limiting this application. Although this application and beneficial effects of this application are described in detail with reference to the foregoing embodiments, persons of ordinary skill in the art should understand that they may still make modifications to the technical solutions described in the foregoing embodiments or make equivalent replacements to some technical features thereof without departing from the scope of the claims of this application.

What is claimed is:

1. A method implemented by a first forwarding device and comprising:
obtaining control information controlling a status of a low-latency forwarding mode in which fast forwarding of a service flow is implemented under dynamic control, wherein the control information comprises an enabling identifier identifying enabling of the low-latency forwarding mode, a start moment of the low-latency forwarding mode, and an end moment of the low-latency forwarding mode, and wherein the low-latency forwarding mode corresponds to the service flow;
storing the control information; and
sending the control information to a second forwarding device for processing the service flow.

2. The method of claim 1, wherein the control information further comprises at least one of a first low latency identifier, a bandwidth requirement of the service flow, or an allowed latency value of the service flow, wherein the first low latency identifier instructs a forwarding device that receives the service flow to forward the service flow in the low-latency forwarding mode, and wherein the allowed latency value of the service flow is an allowed latency value of a forwarding device in a forwarding path comprising the first forwarding device and the second forwarding device.

3. The method of claim 1, further comprising sending a disabling identifier to the second forwarding device, wherein the disabling identifier identifies disabling of the low-latency forwarding mode.

4. The method of claim 1, wherein the control information further comprises a runtime of the low-latency forwarding mode.

5. The method of claim 1, wherein obtaining the control information comprises:
obtaining the control information from a server provided by a provider;
receiving the control information from a user; or
obtaining the control information from an authentication device.

6. The method of claim 1, further comprising further sending the control information in an Resource Reservation Protocol (RSVP) message.

7. The method of claim 1, further comprising further sending the control information in a generic associated channel header (G-ACH) channel message.

8. A method implemented by a second forwarding device and comprising:
receiving control information controlling a status of a low-latency forwarding mode in which fast forwarding of a service flow is implemented under dynamic control; and
performing configuration based on the control information by generating, based on the control information, an entry corresponding to the service flow,
wherein the entry comprises a first low latency identifier, a start moment, and an end moment of the low-latency forwarding mode or the entry comprises a first low latency identifier, a start moment, and a runtime of the low-latency forwarding mode, and
wherein the first low latency identifier instructs a forwarding device that receives the service flow to forward the service flow in the low-latency forwarding mode.

9. The method of claim 8, wherein the control information comprises:
a start moment and an end moment of the low-latency forwarding mode;
a start moment and a runtime of the low-latency forwarding mode; or
an enabling identifier identifying enabling of the low-latency forwarding mode.

10. The method of claim 9, wherein the control information further comprises at least one of a first low latency identifier, a bandwidth requirement of the service flow, or an allowed latency value of the service flow, wherein the first low latency identifier instructs a forwarding device that receives the service flow to forward the service flow in the low-latency forwarding mode, and wherein the allowed latency value of the service flow is an allowed latency value of a forwarding device in a forwarding path comprising a first forwarding device and the second forwarding device.

11. The method of claim 9, further comprising receiving a disabling identifier from a first forwarding device, wherein the disabling identifier identifies disabling of the low-latency forwarding mode.

12. The method of claim 8, wherein the control information comprises an enabling identifier identifying enabling of the low-latency forwarding mode.

13. A first forwarding device comprising:
a non-transitory computer-readable storage medium configured to store programming instructions; and
a processor coupled to the non-transitory computer-readable storage medium and configured to execute the programming instructions to cause the first forwarding device to:
obtain control information controlling a status of a low-latency forwarding mode in which fast forwarding of a service flow is implemented under dynamic control, wherein the control information comprises an enabling identifier identifying enabling of the low-latency forwarding mode, a start moment of the low-latency forwarding mode, and a runtime of the low-latency forwarding mode, and wherein the low-latency forwarding mode corresponds to the service flow;
storing the control information; and
send the control information to a second forwarding device for processing the service flow.

14. The first forwarding device of claim 13, wherein the control information comprises an end moment of the low-latency forwarding mode.

15. The first forwarding device of claim 14, wherein the control information further comprises at least one of a first low latency identifier, a bandwidth requirement of the service flow, or an allowed latency value of the service flow, wherein the first low latency identifier instructs a forwarding device that receives the service flow to forward the service flow in the low-latency forwarding mode, and wherein the allowed latency value of the service flow is an allowed latency value of a forwarding device in a forwarding path comprising the first forwarding device and the second forwarding device.

16. The first forwarding device of claim 14, wherein the processor is further configured to execute the programming instructions to cause the first forwarding device to send a disabling identifier to the second forwarding device, wherein the disabling identifier identifies disabling of the low-latency forwarding mode.

17. The first forwarding device of claim 13, wherein the processor is further configured to execute the programming instructions to cause the first forwarding device to:
obtain the control information from a server provided by a provider;
receive the control information from a user; or
obtain the control information from an authentication device.

18. The first forwarding device of claim 13, wherein the processor is further configured to execute the programming instructions to cause the first forwarding device to further send the control information in an Resource Reservation Protocol (RSVP) message.

19. The first forwarding device of claim 13, wherein the processor is further configured to execute the programming instructions to cause the first forwarding device to further send the control information in a generic associated channel header (G-ACH) channel message.

20. A second forwarding device comprising:
a non-transitory computer-readable storage medium configured to store programming instructions; and
a processor coupled to the non-transitory computer-readable storage medium and configured to execute the programming instructions to cause the second forwarding device to:
receive control information controlling a status of a low-latency forwarding mode in which fast forwarding of a service flow is implemented under dynamic control; and
perform configuration based on the control information by generating, based on the control information, an entry corresponding to the service flow,
wherein the entry comprises a first low latency identifier, a start moment, and an end moment of the low-latency forwarding mode or the entry comprises a first low latency identifier, a start moment, and a runtime of the low-latency forwarding mode, and
wherein the first low latency identifier instructs a forwarding device that receives the service flow to forward the service flow in the low-latency forwarding mode.

21. The second forwarding device of claim 20, wherein the control information comprises:
a start moment and an end moment of the low-latency forwarding mode; or
a start moment and a runtime of the low-latency forwarding mode; or
an enabling identifier identifying enabling of the low-latency forwarding mode.

22. The second forwarding device of claim 21, wherein the control information further comprises at least one of a first low latency identifier, a bandwidth requirement of the service flow, or an allowed latency value of the service flow, wherein the first low latency identifier instructs a forwarding device that receives the service flow to forward the service flow in the low-latency forwarding mode, and wherein the allowed latency value of the service flow is an allowed latency value of a forwarding device in a forwarding path comprising a first forwarding device and the second forwarding device.

23. The second forwarding device of claim 21, wherein the processor is further configured to execute the programming instructions to cause the second forwarding device to receive a disabling identifier from a first forwarding device, wherein the disabling identifier identifies disabling of the low-latency forwarding mode.

24. The second forwarding device of claim 20, wherein the control information comprises an enabling identifier identifying enabling of the low-latency forwarding mode.

* * * * *